US012243216B2

(12) United States Patent
Bufi et al.

(10) Patent No.: US 12,243,216 B2
(45) Date of Patent: Mar. 4, 2025

(54) SYSTEM AND METHOD FOR AI VISUAL INSPECTION

(71) Applicant: Musashi Auto Parts Canada Inc., Arthur (CA)

(72) Inventors: Martin Bufi, Waterloo (CA); Raef Shehata, Waterloo (CA)

(73) Assignee: Musashi Auto Parts Canada Inc., Waterloo (CA)

( * ) Notice: Subject to any disclaimer, the term of this patent is extended or adjusted under 35 U.S.C. 154(b) by 390 days.

(21) Appl. No.: 17/765,222

(22) PCT Filed: Sep. 30, 2020

(86) PCT No.: PCT/CA2020/051306
§ 371 (c)(1),
(2) Date: Mar. 30, 2022

(87) PCT Pub. No.: WO2021/062536
PCT Pub. Date: Apr. 8, 2021

(65) Prior Publication Data
US 2022/0366558 A1 Nov. 17, 2022

Related U.S. Application Data

(60) Provisional application No. 62/907,767, filed on Sep. 30, 2019.

(51) Int. Cl.
*G06T 7/00* (2017.01)
*B25J 19/02* (2006.01)
(Continued)

(52) U.S. Cl.
CPC .......... *G06T 7/0004* (2013.01); *B25J 19/023* (2013.01); *G01N 35/0099* (2013.01);
(Continued)

(58) Field of Classification Search
CPC .................................................. G06T 7/0004
See application file for complete search history.

(56) References Cited

U.S. PATENT DOCUMENTS 6,408,429 B1 * 6/2002 Marrion, Jr. .......... G06T 7/0004
717/100
9,418,431 B2 * 8/2016 Brumovsky ............. H04N 7/18
(Continued)

FOREIGN PATENT DOCUMENTS

EP          3537136 A1    9/2019
JP     2019106090 A  *  6/2019  ........... G06F 18/285
(Continued)

OTHER PUBLICATIONS

European Patent Office, Extended European Search Report for EP Patent App. No. 20872569.7, Sep. 27, 2023.
(Continued)

*Primary Examiner* — Ted W Barnes
(74) *Attorney, Agent, or Firm* — Own Innovation; James W. Hinton

(57) ABSTRACT

Provided is a system and method for visual inspection. The system may be used in a quality assurance station at a manufacturing facility or site. The system may evaluate and determine the quality of manufactured or fabricated articles. The system may include a mechanical subsystem for capturing images of the article. The system may include a sensor such as a camera for capturing data, such as images. The system may include an artificial intelligence system to determine if the article suffers from an impermissible defect.

19 Claims, 27 Drawing Sheets

(51) Int. Cl.
  *G01N 35/00* (2006.01)
  *G05B 19/418* (2006.01)
  *G06T 3/4038* (2024.01)
  *G06V 10/764* (2022.01)
  *G06V 10/82* (2022.01)
  *H04N 23/695* (2023.01)

(52) U.S. Cl.
  CPC ...... *G05B 19/41875* (2013.01); *G06T 3/4038* (2013.01); *G06V 10/764* (2022.01); *G06V 10/82* (2022.01); *H04N 23/695* (2023.01); *G05B 2219/32368* (2013.01); *G06T 2207/20081* (2013.01); *G06T 2207/20084* (2013.01); *G06V 2201/06* (2022.01)

(56) References Cited

U.S. PATENT DOCUMENTS

| | | | |
|---|---|---|---|
| 9,898,815 | B2 | 2/2018 | Yamamoto et al. |
| 2003/0164952 | A1 | 9/2003 | Deichmann et al. |
| 2017/0249729 | A1* | 8/2017 | Greene ................ G01B 11/24 |
| 2017/0278374 | A1 | 9/2017 | Skaaksrud et al. |
| 2019/0096135 | A1 | 3/2019 | Dal Mutto et al. |
| 2019/0272630 | A1* | 9/2019 | Inazumi ................ G06T 7/0008 |
| 2021/0081698 | A1* | 3/2021 | Lindeman .......... G06Q 30/0283 |
| 2021/0398267 | A1* | 12/2021 | Hyatt ...................... G07C 3/14 |
| 2022/0244194 | A1* | 8/2022 | Perron ............... G01N 21/8851 |
| 2022/0284699 | A1* | 9/2022 | Walt ..................... G01N 21/93 |

FOREIGN PATENT DOCUMENTS

| | | | |
|---|---|---|---|
| JP | 2020198471 A | * 12/2020 | ........... B25J 9/1697 |
| KR | 20190031431 A | 10/2017 | |
| KR | 101897582 B1 | 9/2018 | |
| KR | 102336469 B1 | 12/2021 | |
| WO | 2019130307 A1 | 7/2019 | |

OTHER PUBLICATIONS

Japanese Patent Office, Notification of Reasons for Refusal for JP Patent App. No. 2022-544868, Mar. 12, 2024.
Mitsubishi Electric Engineering, Product Monograph for MELSEC iQ-R Series Compliant FL-net (OPCN-2) Interface Unit ER-1 FL2-T, Feb. 2018.
CIPO AS ISA, International Search Report and Written Opinion for PCT/CA2020/051306, Dec. 1, 2021.
Notice of 3rd Party Observation for KR Patent App. No. 2022-7014750, Jul. 8, 2024.

* cited by examiner

| ITEM NO. | PART NUMBER | DESCRIPTION | TYPE | QTY. |
|---|---|---|---|---|
| 2 | 75517-10-02 | SLIDE SUPPORT | MAKE | 1 |
| 3 | 75517-10-03 | SLIDE TRACK PLATE | MAKE | 1 |
| 4 | 75517-10-04 | VERTICAL SLIDE SUPPORT | MAKE | 1 |
| 5 | 75517-10-05 | CAMERA MOUNT PLATE | MAKE | 1 |
| 6 | 75517-10-06 | CROSS BEAM ANGLE | MAKE | 1 |
| 7 | 75517-10-07 | CROSS BEAM | MAKE | 1 |
| 8 | 75517-10-08 | TUNNEL BRACKET | MAKE | 2 |
| 9 | 75517-10-09 | NAME PLATE | MAKE | 1 |
| 10 | 75517-10-10 | CAMSHAFT SUPPORT BLOCK | MAKE | 2 |
| 11 | 75517-10-11 | TAIL CENTER BLOCK | MAKE | 1 |
| 12 | 75517-10-12 | HEAD CENTER BLOCK | MAKE | 1 |
| 13 | 75517-10-13 | HEAD CENTER | MAKE | 1 |
| 14 | 75517-10-14 | PIN POSITION JIG | MAKE | 1 |
| 15 | 75517-10-15 | PROXI BRACKET | MAKE | 1 |
| 16 | 75517-10-16 | TAIL CENTER | MAKE | 1 |
| 17 | 75517-10-17 | ASSEMBLY PLATE | MAKE | 1 |
| 18 | 75517-10-18 | ASSEMBLY PLATE 2 | MAKE | 1 |
| 21 | 75517-10-21 | SLEEVE SPACER | MAKE | 4 |
| 100 | QS-M60 | SERVO MOTOR | KEYENCE | 1 |
| 101 | CPL25-8-12 | POWER COUPLING | MISUMI | 1 |
| 102 | WL18-20 | SPRING | MISUMI | 1 |
| 103 | SFJ6-30-SC11 | STOPPER PIN | MISUMI | 1 |
| 104 | BGCT12 | BEARINGS WITH HOUSINGS | MISUMI | 3 |
| 105 | MXQ20A-30Z-M9BAL | SHORT TRAVEL SLIDE TABLE | SMC | 1 |
| 106 | PSCCJ12-5 | SHAFT COLLAR | MISUMI | 1 |
| 107 | PSAM8 | INDUCTANCE SENSOR | BALLUFF | 1 |
| 113 | E2-100-20-12PZ | CABLE TRACK ENDS (HORIZONTAL) | IGUS | 1 |
| 114 | E2I-10-20-028-0 | CABLE TRACK LINKS (HORIZONTAL) | IGUS | 20 |
| 115 | E2-100-20-12PZ | CABLE TRACK ENDS (VERTICAL) | IGUS | 1 |
| 116 | E2I-10-20-028-0 | CABLE TRACK LINKS (VERTICAL) | IGUS | 14 |
| 117 | 0313408-SOE-55 | PILLAR BASE | SCHUNK | 2 |
| 118 | 0313516-AEV-55 | PILLAR MOUNTING PLATE | SCHUNK | 2 |
| 119 | 0313737-SLH-55-520 | PILLAR | SCHUNK | 2 |
| 120 | LEFS16RA-500-S5 | SERVO SLIDE TABLE | SMC | 1 |
| 121 | MXQ20B-150ZG-M9BAL | LONG TRAVEL SLIDE TABLE | SMC | 2 |
| 122 | RBUW50-80 | GUSSET | MISUMI | 1 |
| 123 | SBHB-30-25-15 | STOPPING BLOCK | MISUMI | 2 |
| 124 | LR-ZB250CN | PHOTOELECTRIC SENSOR | KEYENCE | 1 |
| 125 | OP-87404 | SENSOR BRACKET | KEYENCE | 1 |
| 126 | SSFJC12-120-M8-SC20 | SENSOR COLUMN | MISUMI | 1 |
| 135 | HMHSU30-16 | URETHANE WHEELS | MISUMI | 4 |
| 136 | SHS15-560L | LINEAR SLIDES | THK | 1 |
| 137 | SHS15V1SS | LINEAR SLIDE BLOCK | THK | 2 |
| 800 | 106910 | CAMERA | BASLER | 1 |
| 801 | FL-BC1618-9M 9MP | LENS | RICOH | 1 |
| 802 | LT2QOG025-00-X-W-24V | COAXIAL LIGHT | OPTO | 1 |
| 803 | LT2WRH200-00-1-W-24V | TUNNEL LIGHT | OPTO | 1 |
| 804 | LIGHT CURTAIN | LIGHT CURTAIN | ELECTRICAL | 1 |
| 805 | PANEL | PANEL | ELECTRICAL | 1 |
| 806 | LR6-302PJN | SIGNAL TOWER | ELECTRICAL | 1 |
| 78 | SLSBH17_80_F12_5_M8_N8 | | | 4 |

SYSTEM AND METHOD FOR AI VISUAL INSPECTION

TECHNICAL FIELD

The following relates generally to visual inspection, and more particularly to systems and methods for visual defect inspection of an article using artificial intelligence.

INTRODUCTION

Visual inspection can be an important part of product manufacturing. Defective products can be costly. Discovering defective products at an appropriate stage of the process can be an important step for businesses to prevent the sale and use of defective articles and to determine root causes associated with the defects so that such causes can be remedied.

Existing visual inspection solutions may be difficult to implement in manufacturing and other similar settings where space is limited. Hardware requirements can increase cost and complexity of operations.

In some cases, visual inspection may be still carried out using human inspection. For example, the inspection of camshafts may include a human physically picking up the camshaft and examining it using a magnifying tool. Human visual inspection techniques may be limited in accuracy and speed. Human inspection may be prone to missing defects. Further, human inspection may include the process of manually documenting visual inspection including documenting identified defects and related information. Such documentation processes can further slow inspection.

In some cases of human visual inspection, secondary and tertiary inspections may be performed on articles deemed defective during a primary inspection to confirm results. Such additional inspection steps may increase inspection time per article significantly.

In the case of camshaft inspection, inspection by a primary inspector may take approximately 45 seconds to 1 minute per camshaft. Secondary inspection may increase time to approximately 1.5 minutes per camshaft. Tertiary inspection may further increase time to approximately 2 minutes and 15 seconds. These inspection times do not include travel times associated with the human inspection, which can add to inspection times.

In the manufacturing industry, many visual inspection solutions, including those using artificial intelligence (AI), use the cloud. Other solutions may use on-premise servers or standard form factor computer parts. Many users do not want to use the cloud in order to keep communication locked behind their firewalls and create a data silo. When visual inspection is implemented with servers on-premise, the user is to bear a large setup cost to obtain and install specific GPUs for AI inference which may need to be optimized properly. If the AI ingestion pipeline is not optimized properly, many GPUs may be left running without tasks to complete, drawing huge amounts of power while remaining idle. For example, a regular GPU may draw approximately 250 W.

Further, existing approaches may be difficult to scale up to a user's needs. If the main device fails or breaks, there may be downtime, which can be costly to users.

Visual inspection solutions are desired that can perform local inference at a level that is suitable for defect detection of manufactured articles and at a speed that meets industrial visual inspection requirements, without incurring significant costs.

Accordingly, there is a need for an improved system and method for visual inspection that overcomes at least some of the disadvantages of existing systems and methods.

SUMMARY

Provided is a system and method for visual inspection. The system may be used in a quality assurance station at a manufacturing facility or site. The system may evaluate and determine the quality of manufactured or fabricated articles using any one or more of the methods described herein.

Provided is a system for visual inspection of an article. The system includes a camera for acquiring image data of an article under inspection, a node computing device for receiving the image data from the camera and analyzing the image data using a defect detection model trained to detect at least one defect type, the defect detection model comprising a machine-learning based object detection model configured to receive the image data as an input and generate defect data describing a detected defect as an output, and a programmable logic controller ("PLC") device for receiving the defect data from the node computing device and determining whether the defect data is acceptable or unacceptable by comparing the defect data to tolerance data.

The system may further include a robotic arm for autonomously moving the camera to a first imaging position relative to the article under inspection prior to acquiring the inspection image.

Upon determining the defect data is unacceptable, the robotic arm may be configured to autonomously move the camera to an article identifier position at which an article identifier on the article under inspection is within the imaging zone of the camera and the camera is configured to acquire an image of the article identifier.

The system may further include a robotic arm for autonomously moving the camera through a predetermined sequence of imaging positions during inspection of the article.

The system may further include an article manipulator configured to engage and rotate the article during inspection.

The image data may include a plurality of images acquired during rotation of the article, wherein the node computing device is configured to construct a stitched image from the plurality of images using an image stitching technique, and wherein the image data is provided to the defect detection model as the stitched image.

The system may further include a user control device for receiving data from at least one of the PLC device and the node device, generating a visualization using the received data, and displaying the visualization in a user interface.

The user interface may include a PLC mode and a node device mode, wherein the PLC mode displays a visualization of PLC device operations and the node device mode displays a visualization of node device operations.

The user control device may be configured to switch between the PLC mode and the node device mode automatically.

The node computing device may be configured to send the defect data to the PLC device upon confirming the detected defect has appeared in a requisite number of consecutive image frames.

The PLC device may be configured to generate a stop inspection command upon determining the defect data is unacceptable.

Provided is an artificial intelligence ("AI") visual inspection system comprising a node computing device configured to receive image data of an article under inspection, and analyze the image data using a defect detection model trained to detect at least one defect type, the defect detection model comprising a machine-learning based object detection model configured to receive the image data as an input and generate defect data describing a detected defect as an output. The AI visual inspection system includes a programmable logic controller ("PLC") device communicatively connected to the node computing device and configured to receive the defect data from the node computing device, and determine whether the defect data is acceptable or unacceptable by comparing the defect data to tolerance data.

The defect data may include a defect class corresponding to a defect type, a defect location, and a confidence level.

The defect detection model may include a two-stage object detection model.

The two-stage object detection model may include a Region Proposal Network to generate regions of interest in a first stage, and wherein the regions of interest are sent down a pipeline for object classification and bounding-box regression.

The defect detection model may be configured to perform multiclass classification for classifying instances into one of three or more classes, wherein the classes include at least two defect types.

The defect detection model may be modified to run at the highest possible frame rate.

The defect detection model may include a neural network, and wherein the neural network has been optimized by fusing layers of the neural network to compress the size of the neural network to run on the node computing device.

The node computing device may include a dual layer of security wherein the node device is encrypted and files on the node device are encrypted.

The node computing device may include a defect counter for the article that is updated when the PLC device determines the defect data is unacceptable.

The node computing device may be further configured to determine whether the detected defect is a true detection by tracking the defect across consecutive image frames.

The image data may include a plurality of images acquired during rotation of the article, wherein the node computing device is configured to construct a stitched image from the plurality of images using an image stitching technique, and wherein the image data is provided to the defect detection model as the stitched image.

Provided is a method of automated visual inspection of an article using artificial intelligence ("AI"). The method may include acquiring image data of an article under inspection using a camera, providing the image data to a node computing device, analyzing the image data at the node computing device using a defect detection model trained to detect at least one defect type, the defect detection model comprising a machine-learning based object detection model configured to receive the image data as an input and generate defect data describing a detected defect as an output, sending the defect data from the node computing device to a programmable logic controller ("PLC") device, and determining at the PLC device whether the defect data is acceptable or unacceptable by comparing the defect data to tolerance data.

The method may further include tracking the detected defect across consecutive image frames using the node computing device.

Sending the defect data from the node computing device to the PLC device may be performed in response to the detected defect being tracked across a requisite number of consecutive image frames.

The image data may include a plurality of images acquired during rotation of the article. The method may further include constructing a stitched image from the plurality of images using an image stitching technique, and providing the image data to the defect detection model as the stitched image. The method may further include generating a stop inspection command at the PLC device upon determining the defect data is unacceptable. The method may further include generating an alarm command at the PLC device upon determining the defect data is unacceptable and sending the alarm command to an alarm system configured to generate and output an alarm.

The method may further include continuing inspection of the article upon determining the defect data is unacceptable and updating a defect counter for the article to include the detected defect.

The method may further include upon determining the defect data is unacceptable, autonomously moving the camera to an article identifier position at which an article identifier on the article under inspection is within the imaging zone of the camera; and acquiring an image of the article identifier.

The method may further include linking and storing the article identifier and the defect data in a database.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification. In the drawings:

FIG. 11J is an example parts table for the mechanical inspection subsystem of FIG. 11A, according to an embodiment;

DETAILED DESCRIPTION

Figure 1:
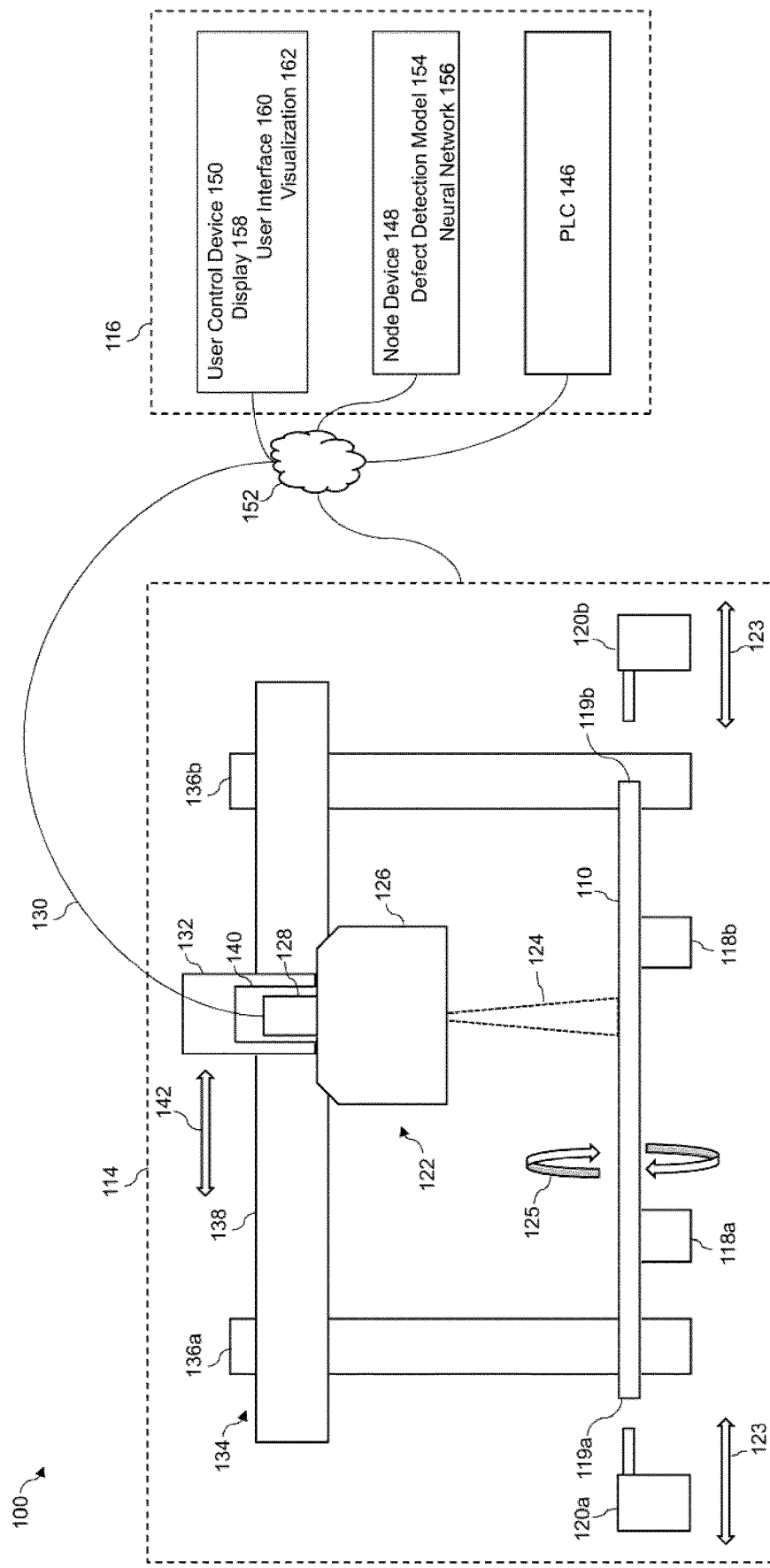
FIG. 1 is a schematic diagram of an AI visual inspection system, according to an embodiment.

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

One or more systems described herein may be implemented in computer programs executing on programmable computers, each comprising at least one processor, a data storage system (including volatile and non-volatile memory and/or storage elements), at least one input device, and at least one output device. For example, and without limitation, the programmable computer may be a programmable logic unit, a mainframe computer, server, and personal computer, cloud-based program or system, laptop, personal data assistance, cellular telephone, smartphone, or tablet device.

Each program is preferably implemented in a high-level procedural or object-oriented programming and/or scripting language to communicate with a computer system. However, the programs can be implemented in assembly or machine language, if desired. In any case, the language may be a compiled or interpreted language. Each such computer program is preferably stored on a storage media or a device readable by a general or special purpose programmable computer for configuring and operating the computer when the storage media or device is read by the computer to perform the procedures described herein.

A description of an embodiment with several components in communication with each other does not imply that all such components are required. On the contrary, a variety of optional components are described to illustrate the wide variety of possible embodiments of the present invention.

Further, although process steps, method steps, algorithms or the like may be described (in the disclosure and/or in the claims) in a sequential order, such processes, methods and algorithms may be configured to work in alternate orders. In other words, any sequence or order of steps that may be described does not necessarily indicate a requirement that the steps be performed in that order. The steps of processes described herein may be performed in any order that is practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

Systems and methods for visual inspection are provided herein. The system can be used to inspect an article. The systems include a nodal architecture. The systems may perform single or two stage object detection. Single stage object detectors may require less computer power but provide reduced accuracy (as compared to two stage detectors). Two stage detectors may be more costly in compute resources for a much higher accuracy and have been one of the biggest challenges facing AI deployment on small, embedded devices. The systems provided herein describe the use of object detectors on low power, small compute edge devices.

Referring now to FIG. 1, shown therein is a visual inspection system 100, according to an embodiment. This visual inspection system 100 is configured to perform defect detection using artificial intelligence techniques.

The visual inspection system 100 is located at an inspection station 108.

The inspection station 108 may be a quality assurance station at a manufacturing facility or site. The quality assurance station may be a station or location at the manufacturing site that is used to evaluate and determine the quality of manufactured or fabricated articles. The quality assurance station may be a separate station designated for evaluating quality or may be integrated within other parts of the manufacturing or processing process (e.g. on a conveyor or the like).

The inspection station 108 may include an automatic transport mechanism, such as a conveyor belt, for transporting articles to and from the inspection station 108.

In variations, the system 100 can advantageously be configured to be positioned inline with respect to existing processes at the manufacturing facility. The inspection station 108 may be a retrofitted conveyor-type system adapted to include components of the system 100. In an example, one or more aspects of the system 100 (e.g. mechanical inspection subsystem 114, computing system 116, each described below) may be integrated with the automatic transport mechanism such that the visual inspection feature provided by the system 100 can be integrated into the existing processes at the site with minimal impact to operations.

While examples described herein may refer to the integration and use of system 100 (and other systems described herein) at a manufacturing site or facility, it is to be understood that the system 100 may be used at any site where visual inspection occurs.

The visual inspection system 100 is used to inspect an article 110.

The system 100 inspects the article 110 and determines whether the article 110 has a defect. Articles 110 may be classified as defective or non-defective by the system 100.

By identifying articles 110 as defective or non-defective, the inspected articles can be differentially treated based on the outcome of the visual inspection. Defective articles 110 may be discarded or otherwise removed from further processing. Non-defective articles 110 may continue with further processing.

Generally, the article 110 is an article in which defects are undesirable. Defects in the article 110 may lead to reduced functional performance of the article 110 or of a larger article (e.g. system or machine) of which the article 110 is a component. Defects in the article 110 may reduce the visual appeal of the article. Discovering defective products can be an important step for a business to prevent the sale and use of defective articles and to determine root causes associated with the defects so that such causes can be remedied.

The article 110 may be a fabricated article. The article 110 may be a manufactured article that is prone to developing defects during the manufacturing process. The article 110 may be an article which derives some value from visual appearance and on which certain defects may negatively impact the visual appearance. Defects in the article 110 may develop during manufacturing of the article 110 itself or some other process (e.g. transport, testing).

The article 110 may be composed of one or more materials, such as metal, steel, plastic, composite, wood, glass, etc.

The article 110 may be uniform or non-uniform in size and shape.

The article 110 may include a plurality of sections. Article sections may be further divided into article subsections. The article sections (or subsections) may be determined based on the appearance or function of the article. The article sections may be determined to facilitate better visual inspection of the article 110 and to better identify unacceptably defective articles.

The article sections may correspond to different parts of the article 110 having different functions. Different sections may have similar or different dimensions. In some cases, the article 110 may include a plurality of different section types, with each section type appearing one or more times in the article 110. The sections may be regularly or irregularly shaped. Different sections may have different defect specifications (i.e. tolerance for certain defects).

The article 110 may be a stand-alone article that is intended for use on its own or may be a component of a bigger article (e.g. a machine part of a larger machine).

The article 110 may be prone to multiple types or classes of defects detectable using the system 100. Example defects types may include paint, porosity, dents, scratches, sludge, etc. Defect types may vary depending on the article 110. For example, the defect types may be particular to the article 110 based on the manufacturing process or material composition of the article 110. Defects in the article 110 may be acquired during manufacturing itself or through subsequent processing of the article 110.

The article 110 may be a power train part for automobiles and/or motorcycles. The power train part may be a camshaft, differential assembly, transmission gear, linkage, suspension part, or a part or component of any of the foregoing.

In a particular embodiment of system 100, the article 110 is a camshaft. Generally, a camshaft is a shaft to which a cam is fastened or of which a cam forms an integral part. The camshaft can be used as a mechanical component of an internal combustion engine. The camshaft opens and closes inlet and exhaust valves of the engine at an appropriate time and in a precisely defined sequence.

The camshaft may include a plurality of different components or parts, with each different component providing a particular function and having particular dimensions. Camshaft components may include any one or more of journals, lobes, ends, and bearings.

The camshaft may be divided into sections to inspect using the system 100. The sections may correspond to the different components of the camshaft (e.g. lobe section, journal section). The camshaft may have 10 to 17 sections to inspect. The 10 to 17 sections may include lobes and journals.

The system 100 may be configured to acquire in the range of 650 to 1700 images per camshaft. The system 100 may acquire in the range of 50-100 images per section. There may be 13 to 17 sections per camshaft. For a section, images may be acquired at every 7.2 degrees of rotation of the camshaft. This may allow for a 360-degree rotation every 2 seconds while still allowing the AI algorithm enough degrees of freedom to properly track defects across the 50-100 images in each section.

The camshaft may include a cylindrical rod running the length of the cylinder bank with a plurality of oblong lobes protruding from the rod. The number of lobes may correspond to the number of valves (e.g. one lobe for each valve). The main journals keep the camshaft in place as it spins around in the engine bay.

The camshaft may be composed of any suitable camshaft material. The camshaft may be made of chilled iron casting or billet steel.

The camshaft may be prone to developing defects whether through the manufacturing process or other processing of the camshaft or its components. Defect types may include paint, porosity, sludge, or the like. Different components, or sections, of the camshaft may develop different types of defects. Defects may affect or impact different components differently. This may be the case because different components perform different functions and thus may have different tolerances for defects. For example, defects to lobes and journals may be treated differently and have different tolerances. In some cases, subsections of a component may have different specifications. For example, lobes (which are egg-shaped) may have different defect specifications based on the location of the defect on the lobe.

In some cases, the camshaft may have porosity specifications as small as 0.4 mm. Porosity specifications may depend on location. As an example, see Table A below:

TABLE A

| Applicable Area | | | Pinhole, Porosity Size |
|---|---|---|---|
| Cam Lobe | Top | Pinhole | Ø 0.4 mm max |
| | | Porosity | No Defect |
| | Excluding Top | | Ø 1.5 mm max |
| Thrust Surface | | | Ø 2.5 mm max |
| VTC Area | | | Ø 0.4 mm max |
| Journal Surface | | | Ø 2.0 mm max |
| Other | | | Ø 2.5 mm max |

The camshaft sections may have non-uniform shapes. This may produce irregular light reflections. Occasionally, the camshaft may be covered with a rust inhibitor (clear). The camshaft may experience random occurrences of sludge or dark oil drops. In some cases, sludge may cover a porosity. The defects (e.g. porosity, sludge) may have different sizes and shapes.

The visual inspection system 100 includes a mechanical inspection subsystem 114 and a computing system 116. The mechanical inspection subsystem 114 and computing system 116 work together to inspect the article 110.

Components of the mechanical inspection subsystem 114 (e.g. actuators, motors, imaging unit) may be installed on a conveyor. Some modification may be made to the components to adapt them onto the conveyor. Such a setup may be used, for example, with article lines having out-conveyors.

The mechanical inspection subsystem 114 includes an article holder 118 for holding the article 110 prior to inspection. During inspection, the article 110 is lifted off the article holder 118.

The article holder 118 includes first and second article holders 118a, 118b. The article holders 118a, 118b are shown in FIG. 1 as being positioned at or near a first end 119a and a second end 119b of the article 110, respectively.

The number and positioning of the article holder 118 (or article holders 118) may vary depending on the article 110 (e.g. shape, dimensions, weight, etc.) or other design choices. Any suitable number of article holders 118 may be used.

The article holder 118 may be modified, as necessary, to accommodate articles 110 of different shapes, sizes, weights, materials, etc.

Other variations of the system 100 may not include an article holder 118, such as where the article 110 is inspected by the system 100 while on a conveyor belt or the like. In such cases, the conveyor belt or other feature may act as the article holder 118.

The mechanical inspection subsystem 114 includes an article manipulator 120.

The article manipulator 120 engages the article 110 and manipulates the article 110 (i.e. moves the article) to facilitate inspection. The article manipulator 120 manipulates the article 110 in a predefined manner based on the article being inspected and the imaging setup.

The article manipulator 120 is adapted to hold the article 110 in position while the article 110 is inspected by the system 100 and in particular as the article 110 is imaged.

The article holder 120 may be configured to permit or restrict certain types of movement of the article 110 during the inspection. For example, the article holder 120 may restrict movement of the article 110 in x, y, and z directions, while permitting rotational movement 125 of the article 110 along a central axis of the article 110.

The manner in which the article manipulator 120 moves the article 110 (e.g. rotationally, horizontally, vertically, etc.) may depend on a variety of factors such as the shape of the article 110 and the positioning of imaging units.

Generally, the article manipulator 120 manipulates the article 110 to position a portion of the article 110 in an imaging zone of an imaging unit (e.g. imaging zone 124 of imaging unit 122, described below). In doing so, the article manipulator 120 may facilitate imaging and inspection of the entire article 110 (or an entire article section), such as by exposing previously unexposed sections or subsections of the article 110 to the imaging equipment.

The article manipulator 120 may be configured to manipulate the article 110 in a series of steps, such as by use of a stepper motor.

The article manipulator 120 includes a first article manipulator 120a and a second article manipulator 120b.

The first and second article manipulators 120a, 120b may be configured to move along a line of motion 123. Movement of the manipulators 120a, 120b may be driven by a motor.

The manipulators 120a, 120b move towards the article 110 along line of motion 123 to promote engagement with the article 110 prior to the start of inspection.

Movement of the manipulators 120a, 120b along line of motion 123 away from the article 110 occurs when inspection of the article 110 is complete and promotes disengagement of the article 110 and engagement a new article (when loaded).

The first article manipulator 120a engages with a first end 119a of the article 110. The second article manipulator 120b engages with a second end 119b of the article 110. The first and second article manipulators 120a, 120b are connected to a motor that drives rotational motion of the manipulators 120a, 120b, which causes the rotation of the article 110 along line of motion 125.

While the embodiment of FIG. 1 shows two article manipulators, any number of article manipulators may be used and may be dictated by the article 110 (size, weight, dimensions) and the type of motion to be imparted to the article 110.

In other embodiments, the article manipulator 120 may include a robot or rotating jig.

The mechanical inspection system 114 may include an article loader. The article loader is not shown in FIG. 1. The article loader is configured to automatically load and unload the article 110 for inspection. Loading and unloading the article 110 may include loading the article 110 onto the article holder 118 and unloading the article from the article holder 118, respectively.

In an embodiment, the article loader may be a robotic device (e.g. a packing robot). The robotic device may drop the article 110 for inspection and pick the article 110 after inspection and deliver the article to either a defective article chute (if defects present) or to a tote or tray (if no defects).

In some cases, the article loader may load the article 110 automatically and the article 110 is unloaded by a human operator. Such may be the case where the inspection is the last process before packing.

The type of article loader used by the system 100 may depend on the production line and the type of article 110 being inspected.

The mechanical inspection subsystem 114 also includes an imaging unit 122. The imaging unit 122 captures images of the article 110 (or a section thereof). The captured images are provided to and analyzed by the computing system 116.

The imaging unit 122 has an imaging zone 124. The imaging zone 124 corresponds to an area from which image data is acquired by the imaging unit 122 and may correspond to the field of view (FOV) of the imaging unit 122.

In an embodiment, the article 110 is imaged by article section. In such a case, the imaging unit 122 is positioned first where a first section of the article 110 is in the imaging zone 124 and an image of the first section is captured. A second section of the article 110 is then positioned in the imaging zone 124 (whether by moving the imaging unit 122 or the article 110) and an image of the second section is captured. The process can be repeated for successive sections of the article 110 until the whole article 110 has been imaged. In some cases, multiple images of each section may be captured. The multiple images of a section may compose a sequence of images. For example, multiple images of the first section may be captured followed by the capture of multiple images of the second section. In some cases, the multiple images may represent a 360-degree imaging of the article 110. In such cases, each of the multiple images includes a portion of the article 110 not previously imaged.

The imaging unit 122 includes a lighting mechanism 126, a camera 128, and a communication subsystem/interface 130.

The lighting mechanism 126 shines light on the article 110. The lighting mechanism 126 may focus or limit the shined light to the imaging zone 124. The lighting mechanism 126 may be controlled by a lighting controller in communication with the lighting mechanism 126.

The lighting mechanism 126 may be configured to shine homogenous or uniform lighting on the article 110 in the imaging zone 124. The lighting mechanism 126 may also be configured to minimize or eliminate shadowing on the article 110.

The lighting mechanism 126 may use one or more types of lighting, such as tunnel lighting, coaxial lighting, or dome lighting.

In an embodiment, the lighting mechanism 126 includes tunnel lighting and coaxial lighting. In another embodiment, the lighting mechanism 126 may include only tunnel lighting.

The type or types of lighting providing by the lighting mechanism 126 may be selected to provide uniform lighting on the article 110 in the imaging zone 124 and to avoid shadowing.

The camera 128 captures image data of the imaging zone 124, including the article 110 positioned in the imaging zone 124, and stores the image data in memory.

The camera 128 may be an area scan camera. The area scan camera may be a BASLER area scan camera (e.g. Basler acA1920-40uc). The area scan camera contains a rectangular sensor with more than one line of pixels, which are exposed simultaneously.

In an embodiment, the system 100 may have a plurality of cameras 128. Using multiple cameras 128 may reduce inspection time. The cameras 128 may each have their own imaging unit 122. In a particular case, the system 100 may have two cameras with each camera responsible for imaging half the article sections. In a camshaft visual inspection example, the cameras may be positioned on each end of the camshaft and responsible for imaging half the sections (e.g. 8 of 16 total sections). Overall inspection time for the camshaft may be reduced by half using the two-camera inspection. Defect detection may be performed as independent processes for images obtained by each of the cameras.

The camera 128 is connected to the computing system 116 via the communication subsystem 130. The communication subsystem/interface 130 may include a communication interface of the camera 128 and a data transfer connector (e.g. usb 3.0 cable).

The communication subsystem 130 transfers data to (including the image data generated by the camera 128) the computing system 116. Data transferred to the computing system 116 includes image data generated by the camera 128.

Figure 2:
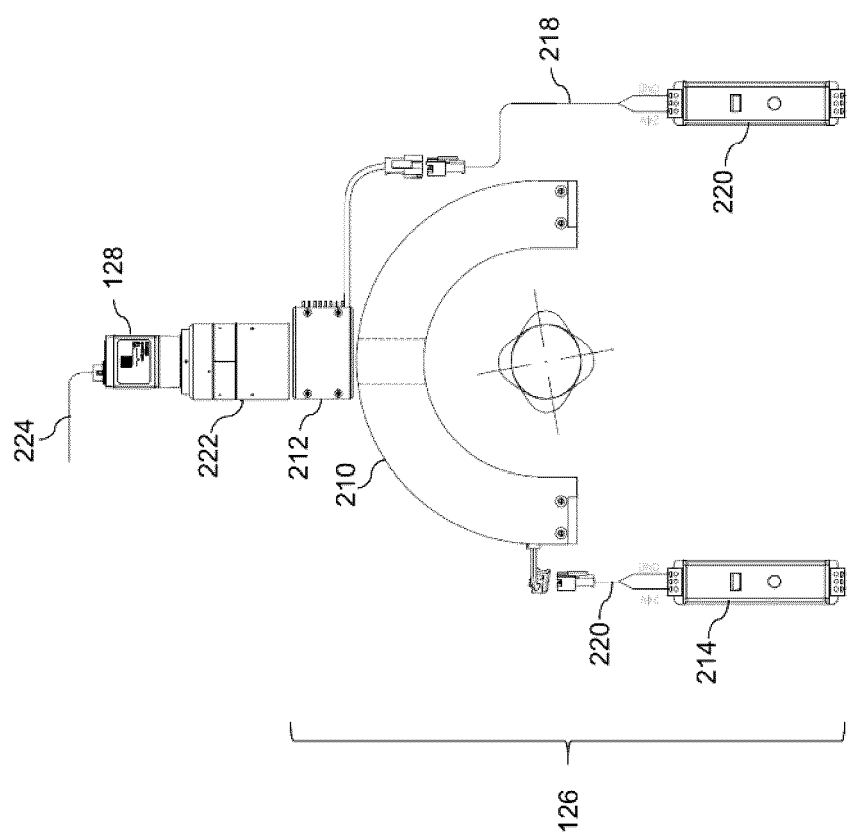
FIG. 2 is a schematic diagram of an imaging unit of the visual inspection system of FIG. 1, according to an embodiment.

Referring now to FIG. 2, shown therein is a front view of the imaging unit 122, according to an embodiment.

The imaging unit 122 includes lighting mechanism 126. The lighting mechanism 126 includes an LED tunnel light 210 and an LED coaxial light 212 positioned above the tunnel light 210. In another embodiment, the tunnel light 210 may be replaced with a dome light. The dome light may be attached to a robotic device, such as a robotic arm (e.g. robotic arm 1484 of FIG. 14).

The tunnel light 210 may be used to provide diffuse lighting for elongated and cylindrical articles 110 (e.g. camshaft). The diffuse lighting may reduce shadows and provide uniform lighting on the article 110.

The coaxial light 212 may help image a highly reflective article 110 (e.g. composed of steel). The light is generated by a diffuse back light and directed at the article 110 using a half-mirror so the lighting axis is the same as the optical axis of the camera 128. This may produce a shadow-free image and may eliminate reflections.

The tunnel light 210 is connected to a tunnel light controller 214 via a first illumination cable 220. The tunnel lighting controller 214 controls the operation of the tunnel light 210 including the amount of light provided.

The coaxial light 212 is connected to a coaxial light controller 220 via a second illumination cable 218. The coaxial lighting controller 220 controls the operation of the coaxial light 212 including the amount of light provided.

Positioned above the coaxial light 212 is a lens 222. The lens 222 may be a high-resolution lens suitable for installation in a machine vision system. The lens 222 may be a 9-megapixel lens.

The lens 222 is connected to the camera 128. The camera 128 is an area scan camera. The camera 128 captures image data of the article 110.

The camera 128 transfers the captured image data to the node device 148 for object detection via a communication cable 224. The communication cable 224 may be a USB 3.0 cable.

Referring again to FIG. 1, the imaging unit 122 is connected to an imaging unit manipulator 132. The imaging unit manipulator 132 moves the imaging unit 122 relative to the article 110 in order to position the article 110 (or a portion thereof) in the imaging zone 124 of the imaging unit 122.

The imaging unit manipulator 132 includes a frame 134. The frame 134 includes uprights supports 136a, 136b and a track 138 fixedly attached to the supports 136a, 136b. As shown in FIG. 1, the track may be arranged substantially parallel to the article 110.

The imaging unit manipulator 132 includes an imaging unit mount 140 that is slidably attached to the track 138. The imaging unit mount 140 is configured to connect to the imaging unit 122 and secure the imaging unit 122 to the frame 134 such that the imaging unit 122 can be moved along the track 138 via the mount 140.

In the embodiment shown in FIG. 1, the imaging unit 122 moves along the track 138 in a horizontal direction along line of motion 142 relative to the article 110. In variations, the imaging unit manipulator 132 may be configured to move the imaging unit 122 in a vertical direction relative to the article 110 or in vertical and horizontal directions relative to the article 110.

In other embodiments, the imaging unit 122 may be stationary and the article 110 moved (for example, via the article manipulator 120 or a conveyor belt) in order to image different sections of the article 110.

Arranging the imaging unit manipulator 132 such that the imaging unit 122 can move in the horizontal direction 142 relative to the article 110 may allow the imaging unit 122 to conveniently capture image data of a plurality of sections of the article 110 along a horizontal axis.

The imaging unit manipulator 132 may operate in coordination with the article manipulator 120 to capture images of the entire article.

The imaging unit manipulator 132 also includes a motor for moving the imaging unit 122. The motor may be a stepper motor. In an embodiment, the imaging unit manipulator 132 includes an actuator for moving the imaging unit 122 vertically (up and down) and a stepper motor for moving the imaging unit 122 horizontally along the length of the article 110. The actuator may be a pneumatic cylinder.

In another embodiment of the system 100, the mechanical inspection subsystem 114 includes a robotic system for imaging the article 110. The robotic system may include a robotic arm and a robotic arm controller comprising a computing device. In an embodiment, the robotic system may be the robotic system 1482 of FIG. 14. The imaging unit 122 (including camera 128 and lighting mechanism 126) may be mounted or otherwise attached to the robotic arm. The robotic arm may replace any one or more of the imaging unit manipulator 132, the frame 134, the upright supports 136, the track 138, and the imaging unit mount 140. The robotic arm may be capable of moving in three dimensions (i.e. not strictly along line of motion 142). Generally, the robotic arm is used to move the imaging unit 122 (camera 128 and lighting mechanism 126) relative to the article 110 being inspected to capture images of multiple sections of the article, such as along a length of the article 110. The robotic arm may function autonomously (i.e. may perform movements, such as moving the camera/imaging unit, autonomously). For example, movements of the robotic arm performed during imaging of the article 110 may be programmed into the robotic arm controller. Programmed movements may vary for different shapes and sizes of articles. Robotic arm movements for imaging an article 110 may include a sequence of movements that are performed for each article 110. The robotic system may include a communication interface such as an Ethernet/IP module (e.g. Ethernet/IP module 1512 of FIG. 15) for communicating with other system 100 components. For example, the robotic system may communicate with a PLC of a production machine or the PLC 146 of the visual inspection system 100 using the Ethernet/IP module.

The visual inspection system 100 includes a computing system 116 for performing various control, analysis, and visualization functions of the system 100. The computing system 116 is communicatively connected to the mechanical inspection system 114 to facilitate data transfer between the computing system 116 and the mechanical inspection subsystem 114 to perform visual inspection.

The computing system 116 includes a programmable logic controller (PLC) 146, a node device 148, and a user control device 150. The devices 146, 148, 150 are communicatively connected to each other, which may include wired or wireless connections. The devices 146, 148, 150 may be connected to each other via a network 152, such as a wired or wireless network. The network 152 may include direct wired connections between components as described herein. Communication of aspects of the mechanical inspection subsystem 114 with other components such as the PLC 146 via the network 152 is represented by a solid line from the mechanical inspection system 114 to the network 152.

The PLC 146 is a digital computer adapted to automate electromechanical processes of the visual inspection system 100. The PLC 146 may provide high reliability control and ease of programming and process fault diagnosis.

The PLC 146 includes a memory (e.g. memory such as RAM or flash) for storing PLC computer programs configured to control various components and operations of the visual inspection system 100 and a processor for executing the PLC computer programs. The PLC 146 includes a communication interface for transmitting and receiving data (e.g. defect data) to and from other components of the system 100.

The PLC computer programs include computer-executable instructions for controlling the movement and operation of one or more components of the mechanical inspection subsystem 114, interfacing with the node device 148 and user control device 150, and processing defect data received from the node device 148.

Figure 4:
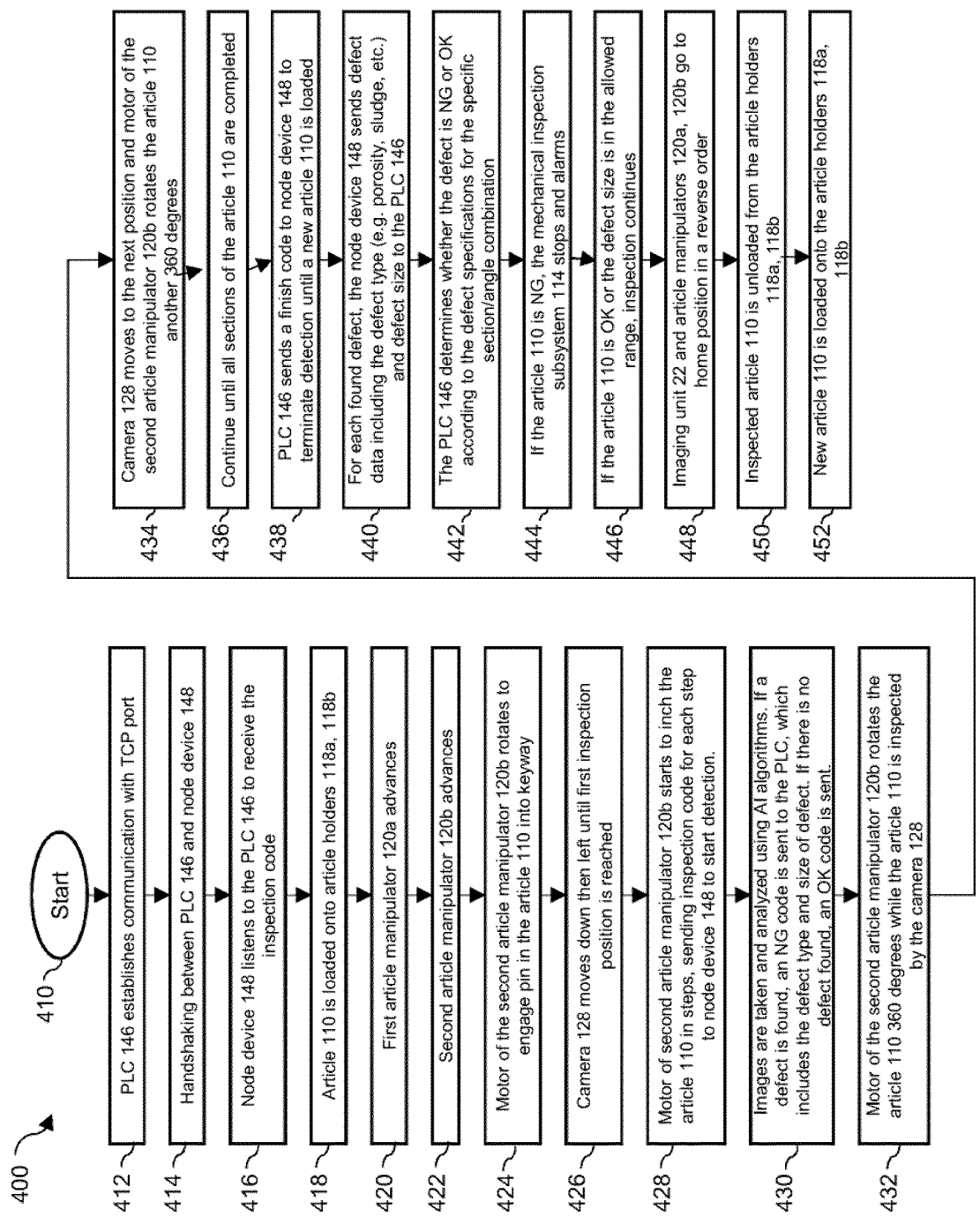
FIG. 4 is a flowchart of a method of a visual inspection sequence, according to an embodiment.

The PLC 146 is also configured to perform an inspection sequence, such as the inspection sequence 400 of FIG. 4.

The PLC 146 controls a plurality of actuators and motors via the PLC computer programs. The actuators and motors move components of the mechanical inspection subsystem 114. Any suitable number of actuators and motors may be used.

The PLC 146 may control the actuators and stepper motors in either manual or automatic modes.

The actuator may be a cylinder, such as a pneumatic cylinder.

The motor may be a stepper motor.

System 100 includes three actuators including a first actuator, a second actuator, and a third actuator.

The first actuator is for horizontal movement. On instruction from the PLC 146, the first actuator moves the article manipulator 120a horizontally towards and away from the first end 119a of the article;

The second actuator is for horizontal movement. On instruction from the PLC, the second actuator moves the article manipulator 120b (including a stepper motor) horizontally towards and away from the second end 119b of the article 110.

The third actuator is for vertical movement. On instruction from the PLC 146, the third actuator moves the imaging unit 122 up and down relative to the article 110.

The mechanical inspection subsystem 114 also includes two stepper motors including a horizontal movement motor and a rotational movement motor.

On instruction from the PLC 146, the horizontal movement motor moves the imaging unit 122 horizontally along the track 138. The imaging unit 122 may be moved in steps corresponding to imaging positions of the imaging unit 122. The imaging positions may correspond to sections of the article 110. The imaging positions may be predefined. Moving to subsequent steps or positions may be based on the PLC 146 receiving a signal from another component of the system 100 (e.g. from the node device 148) or using event-based movement. For example, a robot or camera may be instructed to move from a first section of the article 110 to a second section of the article 110 based on an event, such as detection for the first section being complete.

On instruction from the PLC 146, the rotational movement motor rotates the article 110 to facilitate inspection of the full article (e.g. full 360 degrees). The article 110 may be rotated in steps corresponding to subsections of the article 110 (e.g. 4 degrees).

The imaging unit 122 and article manipulators 120a, 120b each have a return/home position and an advance position. To return to a home position, the article manipulator 120a is moved to horizontally away from the article 110 (to the left) by the first actuator. To return to a home position, the article manipulator 120b is moved horizontally away from the article 110 (to the right) by the second actuator. To return to a home position, the imaging unit 122 is moved vertically up and away from the article 110 by the third actuator. To advance to an advance position, the article manipulator 120a is moved horizontally towards the article 110 (to the right) by the first actuator. To advance to an advance position, the article manipulator 120b is moved horizontally towards the article 110 (to the left) by the second actuator. To advance to an advance position, the imaging unit 122 is moved vertically down towards the article 110 by the third actuator. The imaging unit 122 also moves horizontally down the camshaft (e.g. right to left) to scan the camshaft via the horizontal movement motor.

The PLC 146 is communicatively connected to a plurality of sensors configured to provide machine status data to the PLC 146. The machine status data provides status information for components of the subsystem 114 such as actuators and whether an article 110 is loaded or not.

The PLC 146 interfaces with the node device 148 via the PLC computer programs. The PLC 146 may communicate with the node device 148 through a TCP communication protocol.

Data received by the PLC 146 from the node device 148 includes code indicating whether a defect has been detected by the node device 148 or not.

For example, if the node device 148 finds a defect, the PLC 146 may receive an NG code from the node device 148 indicating that a defect has been found in the article 110 and that the article 110 is defective (i.e. "no good").

The NG code may include defect data describing the defect. The defect data may include a defect type or class (e.g. porosity, sludge, paint, scratch, dent, etc.) and a defect size.

If the node device 148 does not find a defect, the PLC may receive an OK code from the node device 148 indicating that no defect has been found.

The PLC 146 processes defect data received from the node device 148 via the PLC computer programs. The PLC 146 receives motor data from the stepper motors. The motor data may include a horizontal reading (e.g. from first stepper motor horizontal) identifying the section of the article 110. The motor data may include a rotational reading (from the second stepper motor rotational) which identifies a camshaft angle. The camshaft angle may be in reference to a pin/keyway. The PLC 146 uses the motor data to identify the exact X and 8 coordinates of the article 110 (camshaft). The motor data includes section data (e.g. an x coordinate value) and angle data (e.g. a 8 coordinate value). The section data describes a particular section of the article 110 (which can, for example, be related to a horizontal coordinate value, x). The angle data describes a particular article angle (in reference to the article manipulator 120 (e.g. article manipulator 120b includes a stepper motor and keeps an angle of the article 110)). Together, the section data and angle data describe a subsection of the article 110. The article subsection has particular defect specifications (i.e. for the specific section/angle combination) including a tolerance for particular defect types. Defect specifications including tolerances are stored by the PLC 146 in memory and linked to a particular section and angle combination. Different subsections of the article may have different tolerances.

As described above, the PLC 146 is also configured to send data to the node device 148.

Data sent from the PLC 146 to the node device 148 may include inspection code. Inspection code instructs the node device 148 to start detection. For example, the article 110 may be inched rotationally in steps by the rotational motor. For each step, the PLC 146 may send inspection code to the node device 148 instructing the node device 148 to start detection.

In another embodiment, the computing system 116 may use an image stitching technique. For example, the PLC 146 instructs the node device 148 to take an image of the article 110. The PLC 146 then inches the article 110 rotationally (i.e. incrementally rotates the article 110) and instructs the node device 148 to acquire another image of the article 110 (i.e. so that at least a portion of the second image is of a previously unseen portion of the article 110). This process of action by the PLC 146 and the node device 148 may be repeated until an entire 360 degrees of the article 110 has been imaged. The plurality of images representing the 360-degree imaging of the article 110 are then stitched together by the node device 148 to construct a stitched image according to an image stitching technique. The node device 148 then performs object detection on the stitched image. In such a case, object detection may be performed by the node device 148 one time at the last revolution of the 360 degrees on the stitched image. The PLC 146 may send inspection code to the node device 148 at the completion of the 360 revolution of the article 110 instructing the node device 148 to start detection. The node device 148 may construct stitched images and perform object detection on the stitched images for a plurality of adjacent sections of the article 110. Image stitching may advantageously allow for inference to be performed only once on the stitched image representing the entire section of the article covered by the stitched image. The operation of cropping images together into a final large (stitched) image may provide the system with the highest quality image.

Data sent from the PLC 146 to the node device 148 may include a finish code. The finish code instructs the node device 148 to terminate detection. The finish code may instruct the node device 148 to terminate detection until a new article 110 is loaded.

The PLC 146 may also send handshaking data to and receive handshaking data from the node device 148. Handshaking data includes certain codes that, when exchanged between the PLC 146 and the node device 148, establish a communication channel between the device 146, 148.

The PLC 146 interfaces with the user control device 150 via the PLC computer programs. The PLC 146 may send data to the user control device 150 indicating status of subsystem 114 operations. Such received data may be visualized by the user control device 150. The PLC 146 may also receive data from the user control device 150. Such data may control operations of the PLC 146 or subsystem 114 according to user input received at the user control device 150.

Referring now to the node device 148, the node device 148 may be an edge computing device. The node device 148 may be an edge device specifically configured to run AI applications and perform deep learning tasks and may include processing components suited or adapted to performing such tasks.

In an embodiment, the node device 148 is a JETSON XAVIER device.

The node device 148 may provide an edge solution that is secure and without a need to connect to devices outside the inspection site or facility. This may allow data to stay on premises.

The node device 148 may be encrypted (e.g. device-level encryption). Files on the node device 148 may also be encrypted (e.g. file-level encryption). This may provide a dual layer of security.

In an embodiment, the system 100 may include a plurality of node devices 148 arranged in a nodal architecture. The multiple node devices 148 may run simultaneously and communicate back and forth with the PLC 146. Such an architecture may promote efficient scale up for users. The nodal architecture also may reduce potential downtime caused by equipment problems as, if one node device 148 fails or breaks, the non-functioning node device can be replaced by plugging in a replacement node device.

The node device 148 may advantageously reduce costs associated with the visual inspection system, particularly over existing edge-based approaches. Such existing edge-based approaches may typically use regular Nvidia or comparable graphics cards that require computer hardware to run.

By using the node device 148 to perform inference tasks (i.e. object detection, defect classification), the visual inspection system 100 may reduce power consumption as compared to existing onsite inference approaches that use large servers having GPUs that may have a draw in the range of 250 W. For example, the node device 148 may have a significantly lower draw in the range of 30 W.

The node device 148 is an embedded computing device.

The node device 148 includes processing components and storage components.

The processing components may include one or more CPUs and GPUs.

The storage components include memory such as RAM and flash.

The node device 148 also includes a communication interface for communicating with the PLC 146, user control device 150, and camera 128.

The node device 148 stores one or more computer programs in memory including computer-executable instructions that, when executed by the processing components of the node device 148, cause the node device 148 to perform the actions and functions described herein.

The node device 148 is configured to run artificial intelligence at the edge. Advantages of performing the AI at the edge using the node device 148 may include faster inference speed, lower latency between image ingestion and inference result, and data never having to leave the premises.

The node device 148 is configured to send and receive certain codes to and from the PLC 146 to establish communication therewith.

The node device 148 receives inspection code from the PLC 146. Upon receiving the inspection code, the node device 148 starts an object detection pipeline.

The node device 148 is communicatively connected to the camera 128 and instructs the camera 128 to acquire images of the article 110. The node device 148 may communicate with the camera 128 via an API or the like.

The node device 148 includes a defect detection model 154. The defect detection model 154 is a machine learning-based model configured to analyze image data of the article 110 and identify defects therein. The defect detection model 154 uses object detection techniques to identify defects in the image data. The defect detection model 154 may be configured to perform multiclass classification for classifying instances into one of three or more classes. Classes may correspond to different defect types that the defect detection model 154 has been trained to detect. The classes may include at least two defect types.

The node device 148 may include software modules configured to train, optimize, and run the defect detection model 154.

The defect detection model 154 may utilize an Object Detection API such as TensorFlow Object Detection API or the like. The Object Detection API may be an open source framework that facilitates construction, training, and deployment of object detection models.

The defect detection model 154 is configured to perform defect classification. The defect classification includes assigning a detected defect to a defect class. Defect classes are associated with particular defect types (e.g. dent, paint, scratch, etc.) the defect detection model 154 is trained to detect. The object detection model 154 may be optimized to learn how to ignore anomalies such as dirt, sludge, oil and water marks which may be present on the article 110 (i.e. via training of the model 154). The ability of the object detection model 154 to ignore such anomalies may advantageously reduce the rate of false alarms.

The defect detection model 154 generates defect data from analyzing the image data. The defect data includes information about an identified defect, such as a defect type, a defect size, a defect confidence level, and a defect location.

The node device 148 stores the defect data in one or more storage components. The node device 148 may send the defect data to the PLC 146 for further processing. The PLC 146 processes the defect data and determines whether the defect constitutes an unacceptable defect (outside tolerance) or an acceptable defect (within tolerance).

The node device 148 may send the defect data to the user control device 150 for visualization.

In an embodiment, the defect detection model 154 includes a neural network 156. The neural network 156 is trained on images of defective and non-defective articles 110. Training may be performed according to known training techniques and techniques described herein.

In an embodiment, the neural network 156 is generated using model training and conversion for inference which may include taking a pretrained model, training the pretrained model with new data, pruning the model, retraining the pruned model to generate an output model, and passing the output model through an engine (e.g. Tensor® engine and/or an optimized CUDA backend).

The neural network 156 may be a Faster Region-based Convolutional Neural Network (faster R-CNN) or CSPDarknet53.

The faster R-CNN may have a ResNet or Inception classification backbone. The ResNet may be ResNet 50 or ResNet 101. The Inception may be Inception v2.

The neural network 156 (e.g. CSPDarknet53) may use the new state-of-the-art techniques such as Weighted-Residual-Connections (WRC), Cross-Stage-Partial-connections (CSP), Cross mini-Batch Normalization (CmBN), Self-adversarial-training (SAT), and Mish-activation to achieve similar two-stage object detection results while only being a single stage detector.

The neural network 156 described above may be optimized to run on the node device 148. Optimization may be performed according to the optimization methods described herein. Optimization may include any one or more of Kernel Auto-Tuning, Layer and Tensor Fusion, Precision Calibration (FP32 to FP16), CUDA optimization, and utilizing Dynamic Tensor memory. Optimization may fuse layers of the neural network 156 to compress the network size to run on the node device 148. This may allow the network 156 to run effectively on the node device 148, allowing for local inference at the edge.

The node device 148 may have per image processing times to allow for real-time speeds. The node device 148 may have a per image processing time of approximately 25 ms to 60 ms per image size of over 1000 (width)×1000 (height) pixels. In embodiments where the node device 148 is a general GPU, processing time per image may be in the range of 5 ms to 60 ms.

The defect detection model 154 may include a two-stage object detection model. The two-stage object detection model may be trained with a training framework such as TensorFlow or the like. The two-stage object detection model may include modifications to any one or more of input image size, batch numbers, and first stage and second stage proposals. Such modifications may improve efficiency of the model while keeping accuracy as high as possible or at an acceptable level.

The two-stage detection model may use a Region Proposal Network to generate regions of interest in a first stage. The regions of interest are then sent down a pipeline for object classification and bounding-box regression.

Once the defect detection model 154 is pre-trained, the neural network 156 weights may be fine-tuned using transfer learning. Transfer learning may reduce the size of the dataset and decrease total training time while obtaining acceptable results.

The defect detection model 154 may include a CNN pretrained on a very large dataset (e.g. ImageNet, which contains 1.2 million images with 1000 categories, or Common Objects in Context (COCO)), and then use the CNN either as an initialization or a fixed feature extractor for the defect detection task.

Fine tuning using transfer learning may include fine tuning a CNN. Fine tuning the CNN may include replacing and retraining a classifier on top of the CNN on a new dataset and fine-tuning weights of the pretrained network by continuing backpropagation. All of the layers of the CNN may be fine-tuned or some of the earlier layers may be kept fixed (e.g. due to overfitting concerns) and some higher-level portion of the network may be fine-tuned. This may be motivated by the observation that the earlier features of a CNN contain more generic features (e.g. edge detectors or color blob detectors) that should be useful to many tasks, but later layers of the CNN become progressively more specific to the details of the classes contained in the original dataset.

In an embodiment, the defect detection model 154 (e.g. neural network 156) may be modified to run more efficiently on the node device 148 (e.g. Jetson Xavier).

For example, the model may be modified to run at the highest possible frame rate (FPS). The frame rate refers to the frame rate of inference per single image. The frame rate may be determined by numerous factors (e.g. image size, number of layers, number of anchor boxes, algorithms within network, operations within network, floating point precision, layer fusion, etc.). A higher FPS inference by the node device 148 may decrease inspection time to levels more suitable to industrial manufacturing inspection processes.

The defect detection model 154 may be optimized for inference on the node device 148.

The defect detection model 154 may be optimized with Tensor® or OpenCV (CUDA). Optimization may occur after an optimal number of training iterations to ensure the model is not overfitted and training with augmented images to reduce overfitting.

Training of the defect detection model 154 may include image augmentation. Data augmentation may be performed to increase the variability of the input images, so that the designed object detection model has higher robustness to the images obtained from different environments. Two augmentations strategies that may be implemented include photometric distortions and geometric distortions in aiding with training object detection models. In dealing with photometric distortion, the brightness, contrast, hue, saturation, and noise of an image may be adjusted. For geometric distortion, random scaling, cropping, flipping, and rotating may be added. Other special augmentations may include, for example: random erase, CutOut, Dropout/Drop Connect/Dropblock in the feature map, Mixup (with two different images), CutMix, Mosaic augmentation.

By augmenting images during training, the training set can be grown artificially, which may increase robustness of the generalizing capability of the defect detection model 154 (object detector).

The network may then run on the node device 148 at FP16 precision in python. The network optimization is run on the node device 148 itself. This is because it utilizes the available hardware and kernels optimized with CUDA at current time of execution.

The user control device 150 includes a processor, a memory, and an output interface. The output interface includes a display 158. The user control device 150 includes a communication interface for transmitting and receiving data to and from other components of the system 100, such as the PLC 146 and the node device 148.

The user control device 150 also includes an input interface for receiving input from an operator. The input interface may be a touchscreen on the display 158.

In an embodiment, the display 158 of the user control device 150 may operate both as a touch display and a regular monitor with high resolution.

The memory stores data received from the PLC 146 and the node device 148, including defect data.

The memory also stores one or more computer programs for generating and displaying a user interface 160. The user interface 160 includes a visualization 162 of results of the visual inspection.

The processor may generate the visualization 162 based on defect data received from the node device 148.

In an embodiment, the user interface 160 may include a PLC mode and a node device mode. In the PLC mode, the user interface 160 generates and displays a visualization of PLC operations (e.g. mechanical inspection subsystem 114 in operation). The visualization in the PLC mode is generated using data from the PLC 146. In the node device mode, the user interface 158 generates and displays a visualization of the node device operations (e.g. object detection). The visualization in the node device mode is generated using data from the node device 148. Switching between PLC mode and node device mode may be programmed to occur automatically (e.g. to node device mode when detection is being performed) or may occur manually such as through receiving commands from the operator via the input interface.

In an embodiment, the visual inspection system 100 may be configured to stop inspection of the article 110 once a defect is detected (and confirmed). Such an embodiment may provide speed advantages by limiting unnecessary inspection of a defective article 110. For example, if the article 110 has 10 sections and a defect is identified by the computing system 116 in the third section of the article 110, the visual inspection system 100 may stop inspection of the article and not proceed with inspecting the remaining 7 sections. The article 110 is unloaded and a new article is loaded and inspected. In some cases, upon stopping inspection of the article 110, the system 100 may read an article identifier on the article 110 (e.g. by moving imaging unit 122 and acquiring an image of the article identifier) and associate the identifier with the defect article before unloading. Stopping inspection may be initiated by the PLC 146 (e.g. after determining a detected defect is outside tolerance). The PLC 146 may send a stop inspection command to one or more components of the mechanical inspection subsystem 114. The stop inspection command, when received and processed by the receiving component, may cause the receiving component to perform one or more actions facilitating the stopping of inspection (e.g. moving the imaging unit 122 to a different position, unloading the article 110 from the article manipulator 120, moving the article 110 out of the inspection area, loading a new article onto the article holder 118, etc.).

In another embodiment, the visual inspection system 100 may continue after a defect has been found (i.e. not stop after a first defect identified and the article ruled defective). In such cases, the computing system 116 may include a defect counter for the article 110 that is updated each time a defect is found on the article 110 (i.e. detected in the image data). The defect counter is configured to keep a record of the defects detected for the article under inspection. Updating the defect counter may include adding defect data for the new detected defect to the record. The defect counter may comprise one or more software modules and may be implemented by the node device 148. In some cases, the defect counter may be updated with a new defect only when the defect is confirmed as a true detection using object tracking. The defect counter may be updated with a new defect only when the defect is determined unacceptable by the PLC 146 (e.g. by comparing to threshold).

The visual inspection system 100 may provide faster and/or more precise visual inspection of the article 110 as compared to existing techniques.

In some cases, the visual inspection system 100 may be able to detect a defect (e.g. porosity in a camshaft) in the presence of other miscellaneous objects (e.g. sludge) that may typically obscure such defects (e.g. when examined by a human). This may be particularly advantageous in manufacturing and other environments where articles 110 are not always clean and may have materials on the articles 110 that may hinder detection under existing approaches.

Embodiments may inspect subsections within each section at 4 degrees each, with a 360-degree rotation for each section (rotation provided by the article manipulator 120). For each section of the article 110 (e.g. camshaft), the article 110 may be imaged, rotated a certain number of degrees, and imaged again. This is performed for a full revolution of the article 110 for each section.

In an embodiment, defect data generated by the computing system 116 may be stored in a defect analytics database. Defect data stored in the analytics database may be provided from the node device 148. The defect data in the defect analytics database may be analyzed for analytics purposes to provide plant managers or other operators with a bigger picture of defect detection in the articles. For example, defect data for a number of articles 110 may be provided to a computing device configured to analyze the defect data and identify trends, sizes, and the like. Analysis may include the use of statistical libraries and machine learning (e.g. clustering) to see defect types and other trends. A report including such information may be generated and displayed to the operator, for example via the display 158.

Figure 3:
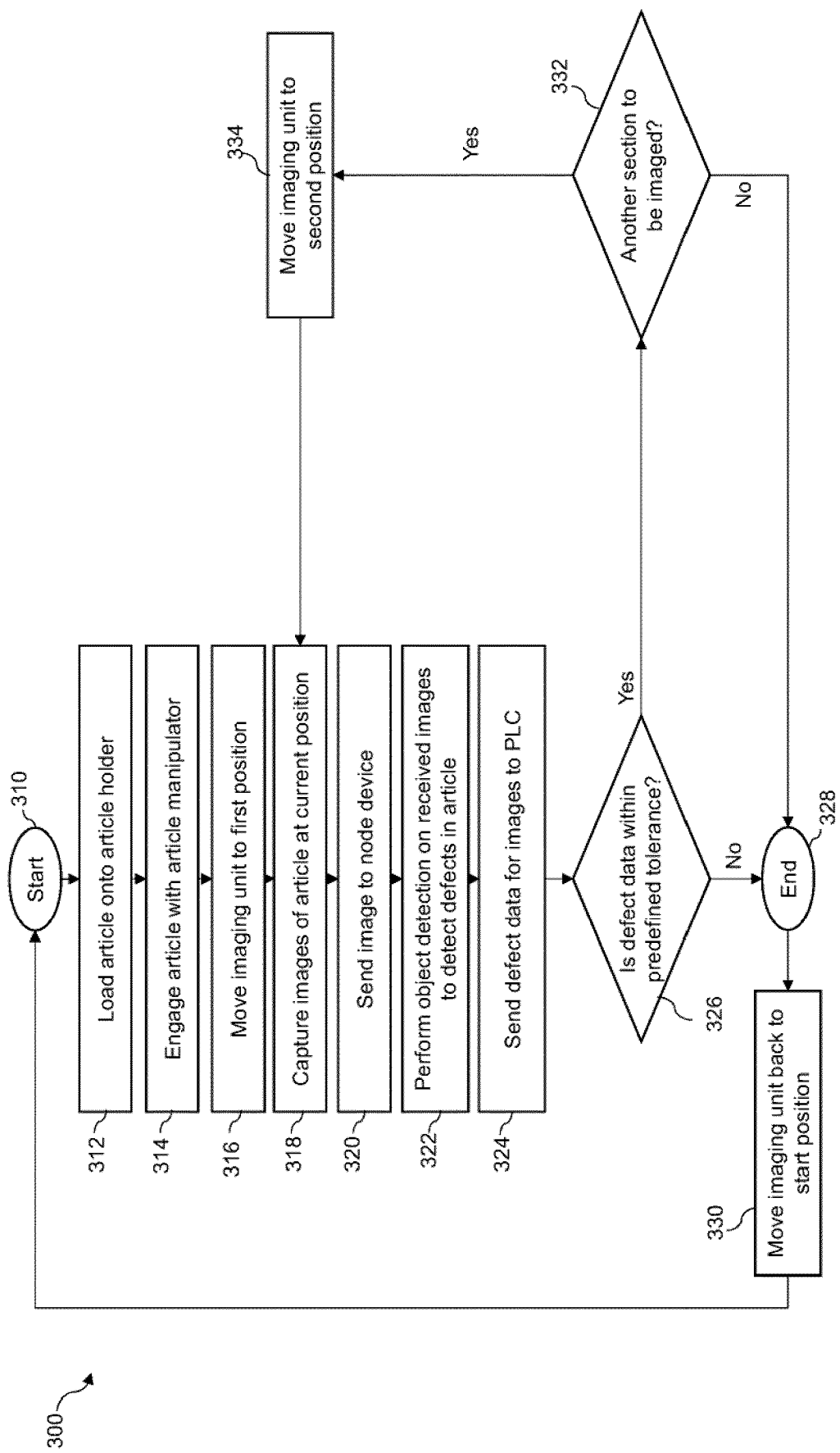
FIG. 3 is a flowchart of a visual inspection sequence, according to an embodiment.

Referring now to FIG. 3, shown therein is a visual inspection sequence 300, according to an embodiment. The sequence 300 may be performed by system 100 of FIG. 1.

At 310 the sequence starts.

At 312, the article 110 is loaded onto the article holder 118.

At 314, the article manipulator 120 engages with the article 110. This may allow the article manipulator 120 to move (e.g. rotate) the article 110 during inspection.

At 316, the imaging unit 122 is moved to a first imaging position. The imaging unit 122 is moved via the imaging unit manipulator 132.

At 318, the camera 128 of the imaging unit 122 captures images of the article 110 at the current imaging position.

At 320, the images are sent from the camera 128 to the node device 148.

At 322, the node device 148 performs object detection on the received images to detect defects in the article 110. Object detection is performed using the defect detection model 154. The images are analyzed to generate defect data.

At 324, the defect data for the images is sent to the PLC 146.

At 326, the PLC determines whether the defect data is within a predefined tolerance. The predefined tolerance is stored as tolerance data at the PLC 146. The determination at 326 may include comparing or referencing some or all of the defect data with the tolerance data.

At 328, if the defect data is not within the predefined tolerance, the article 110 is identified as defective and inspection ends.

At 330, the imaging unit 122 is moved back to the start or home position via the imaging unit manipulator 132. Once back at the home position, the sequence can return to start the process at 10 for another article 110.

At 332, if the defect data is within the predefined threshold at 326, the PLC 146 determines whether there is another section of the article 110 to be imaged.

At 334, if there is another section to be imaged, the imaging unit 122 is moved via the imaging unit manipulator 132 to a second imaging position corresponding to the unimaged section.

Once the imaging unit 122 is moved to the second imaging position, the process 300 returns to 318 and images of the article 110 at the current imaging position (i.e. the second imaging position) are captured and the process resumes.

If there is no other section of the article 110 to be imaged, the inspection ends at 328. At 330, the imaging unit 122 is moved back to the home position and a new inspection can start at 310.

Referring now to FIG. 4, shown therein is a visual inspection sequence 400, according to an embodiment. The inspection sequence 400 may be performed by the visual inspection system 100 of FIG. 1.

At 410, the inspection sequence 400 starts.

At 412, the PLC 146 establishes communication with a TCP port. This may occur upon starting up the inspection system 100.

At 414, handshaking is performed between the PLC 146 and the node device 148 through sending and receiving certain codes. The handshaking initiates communications between the PLC 146 and the node device 148. The handshaking begins when one device sends a message to another device indicating that it wants to establish a communications channel. The two devices 146, 148 then send messages back and forth that enable them to agree on a communications protocol.

At 416, after handshaking is complete, the node device 148 keeps listening to the PLC 146 to receive an inspection code. The inspection code instructs the node device 148 to perform inspection on the article 110 in the imaging zone 124 of the camera 128.

At 418, the article 110 is loaded onto the article holder 118. The article 110 may be loaded manually, or automatically. Automatic loading may include integration with a conveyor or the like.

At 420, the first article manipulator 120a advances, moving towards the article 110. The first article manipulator 120a is moved via a first actuator (center 1).

At 422, the second article manipulator 120b advances, moving towards the article 110. The second article manipulator 120b is moved via a second actuator (center 2).

Figure 11A:
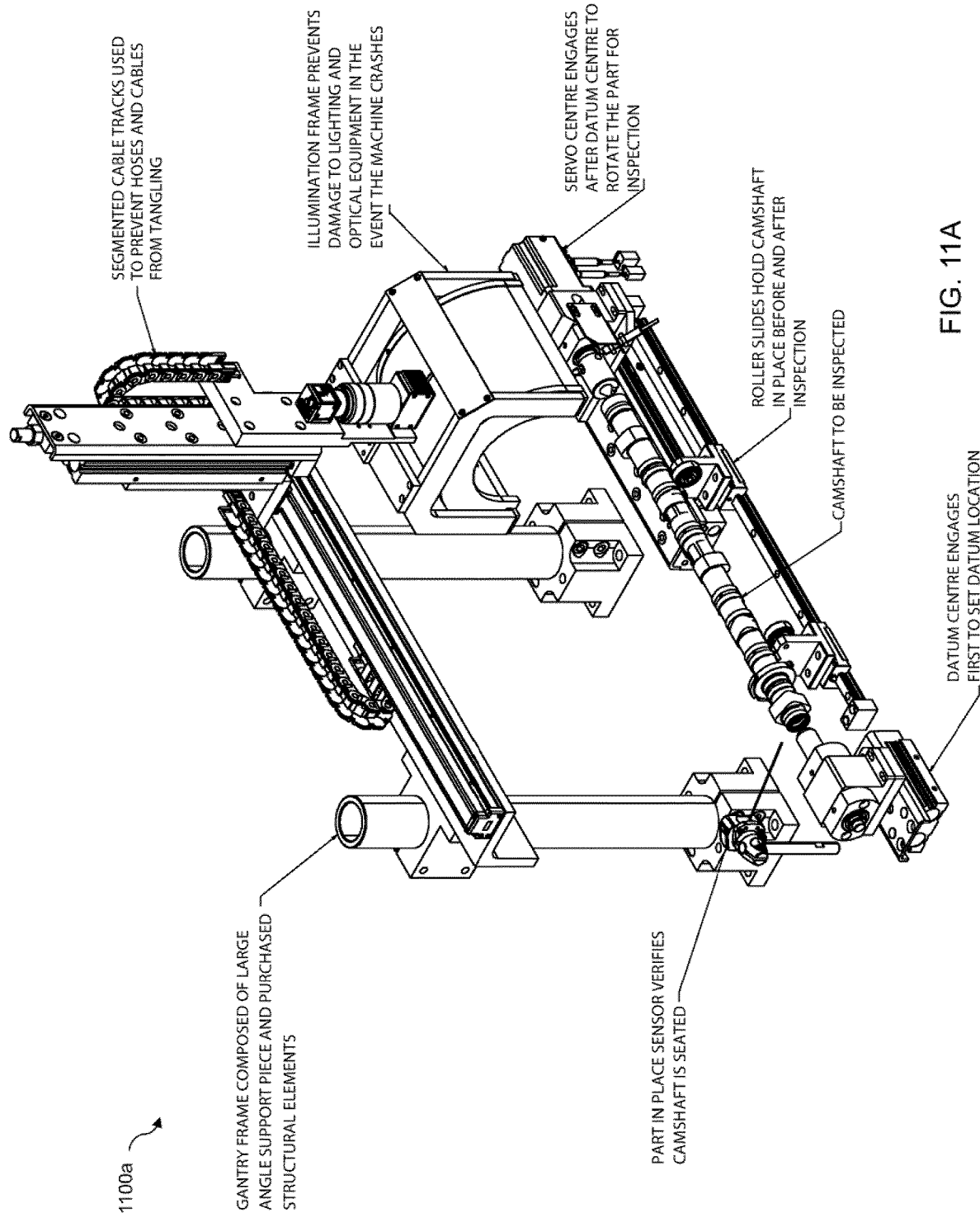
FIG. 11A is a first perspective view of a mechanical inspection subsystem, according to an embodiment.
Figure 11B:
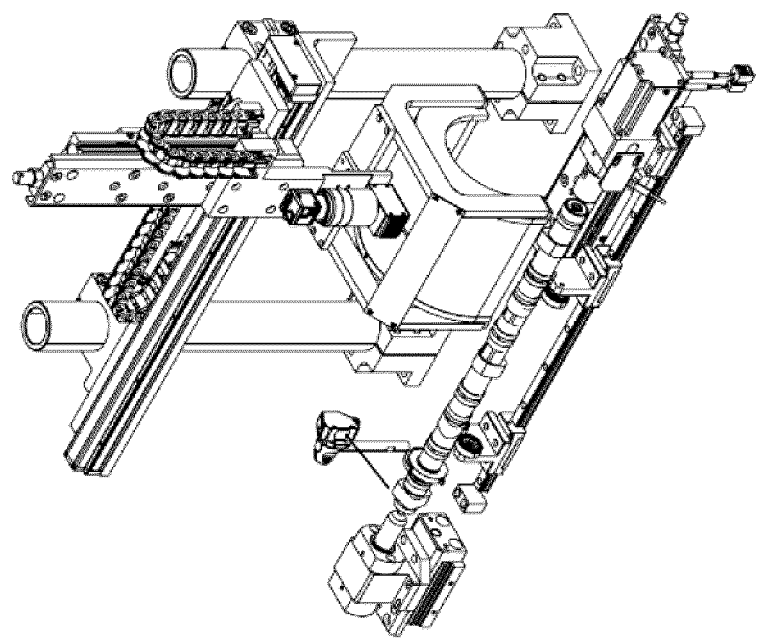
FIG. 11B is a second perspective view of the mechanical inspection subsystem of FIG. 11A, according to an embodiment.
Figure 11C:
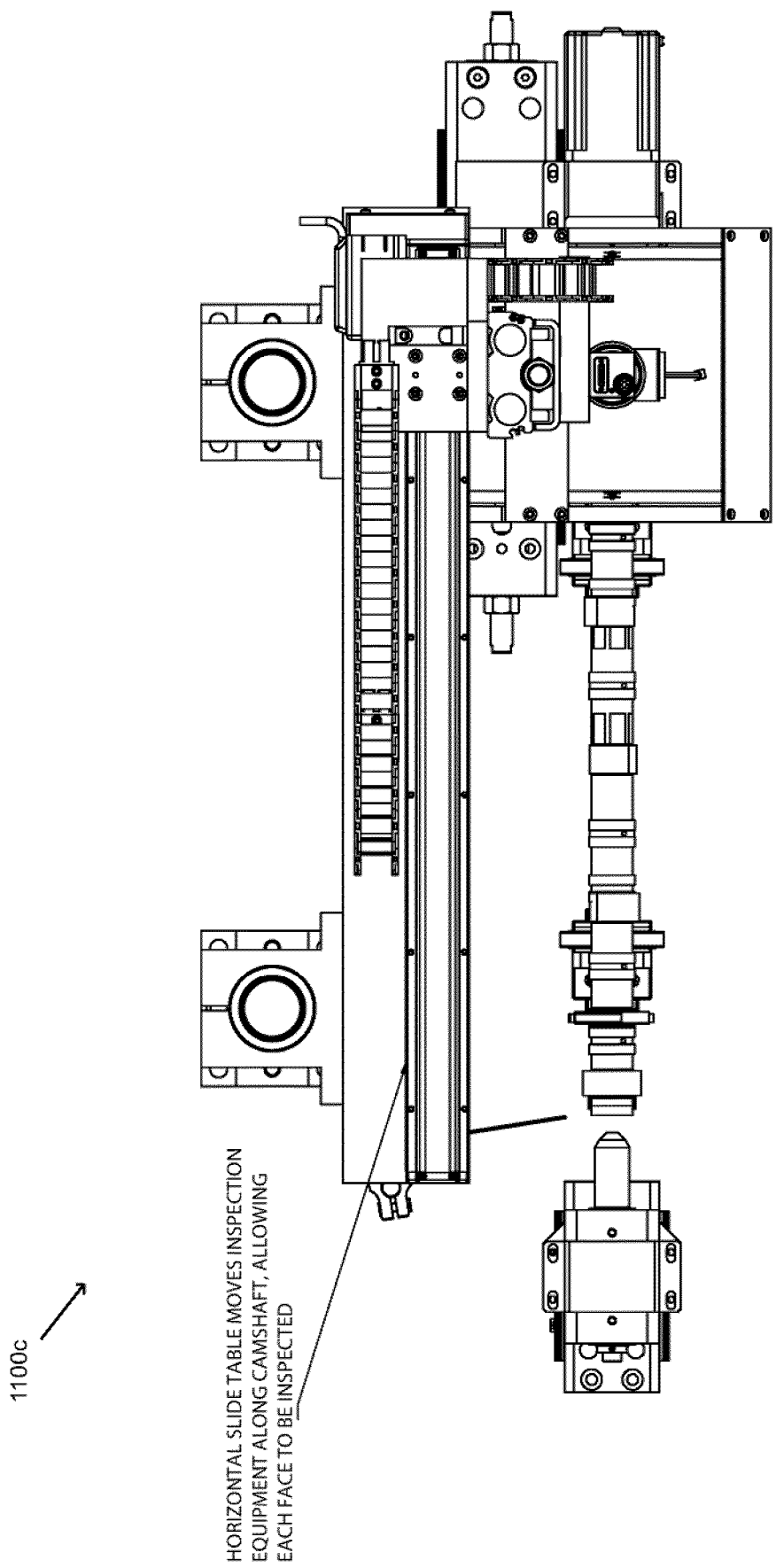
FIG. 11C is a top view of the mechanical inspection subsystem of FIG. 11A, according to an embodiment.
Figure 11D:
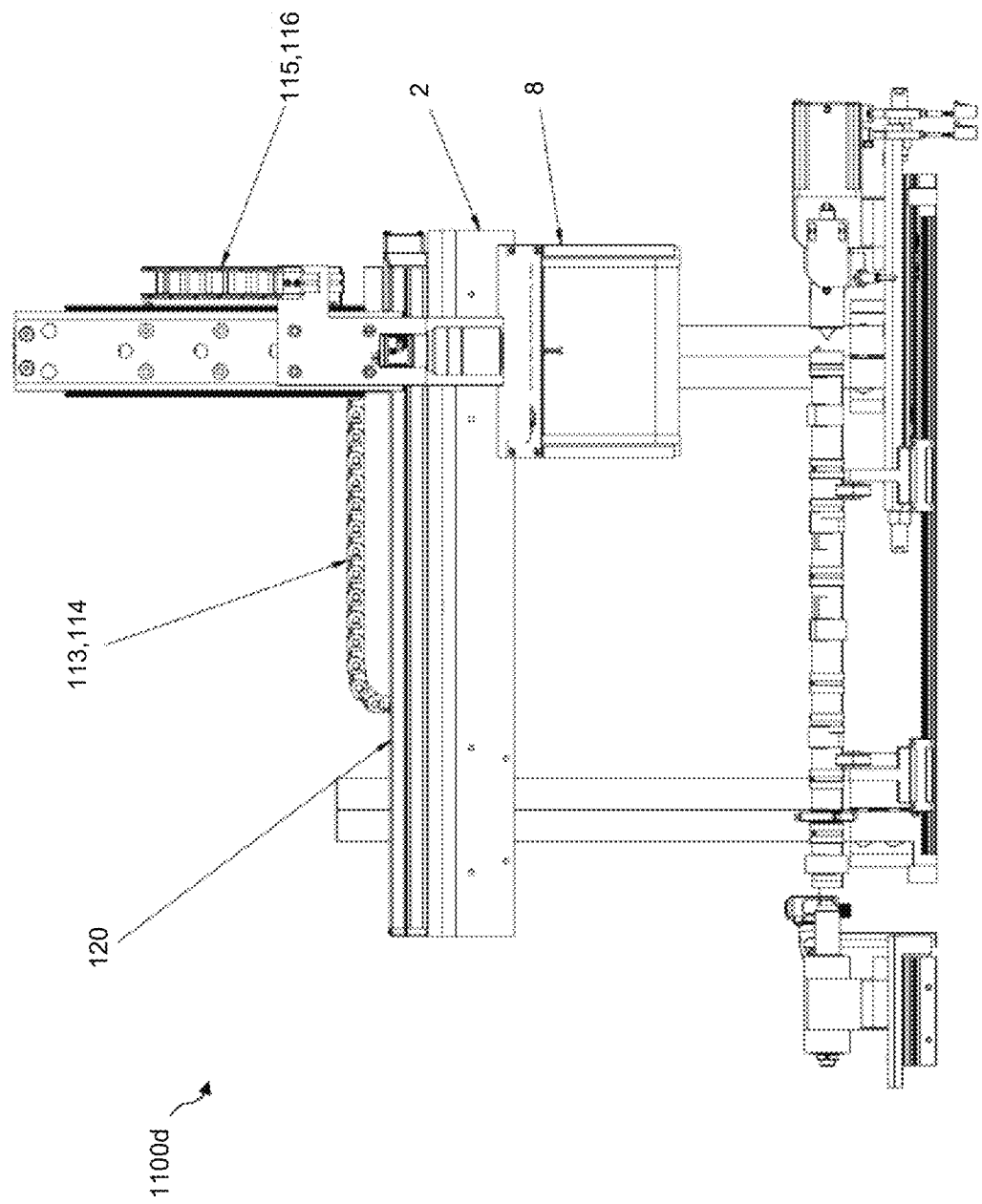
FIG. 11D is a front view of the mechanical inspection subsystem of FIG. 11A, according to an embodiment.
Figure 11E:
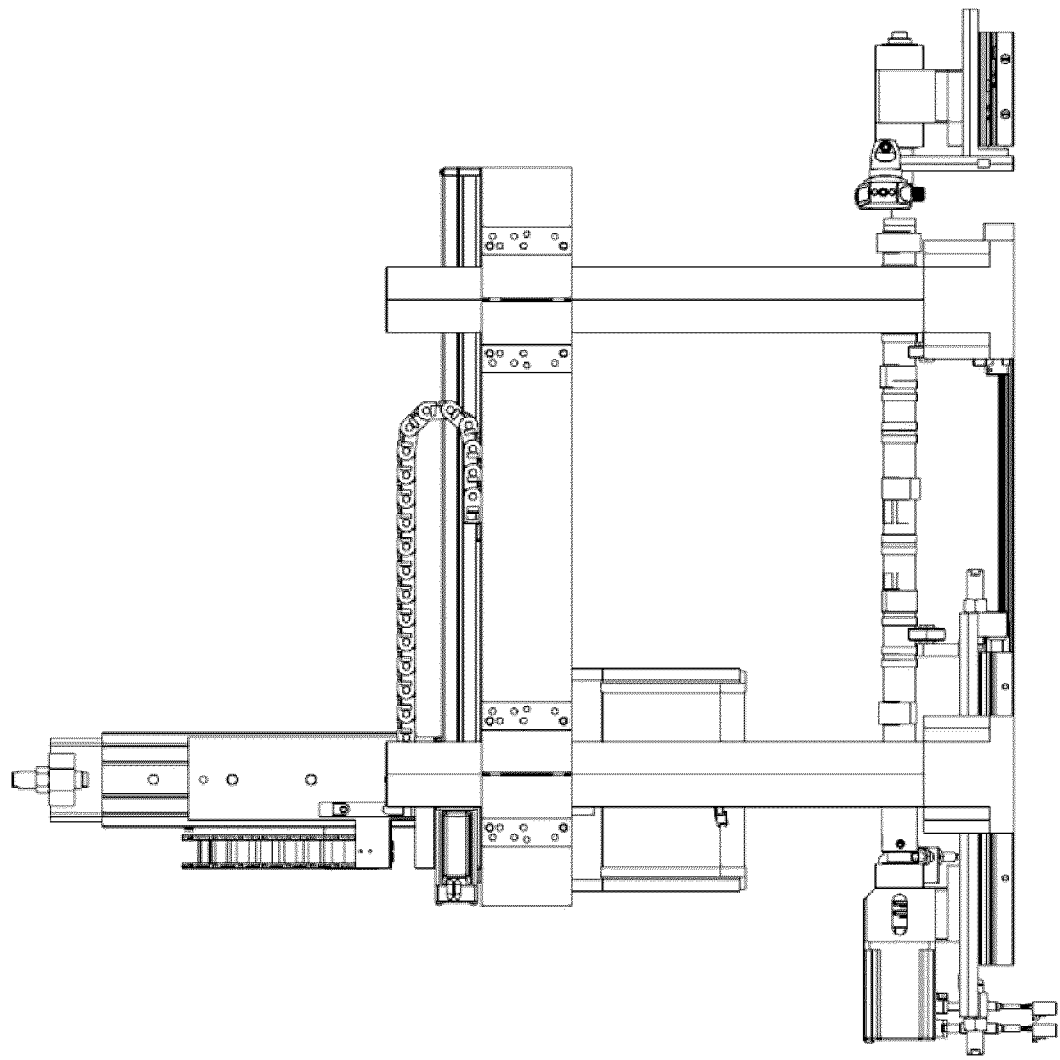
FIG. 11E is back view of the mechanical inspection subsystem of FIG. 11A, according to an embodiment.
Figure 11F:
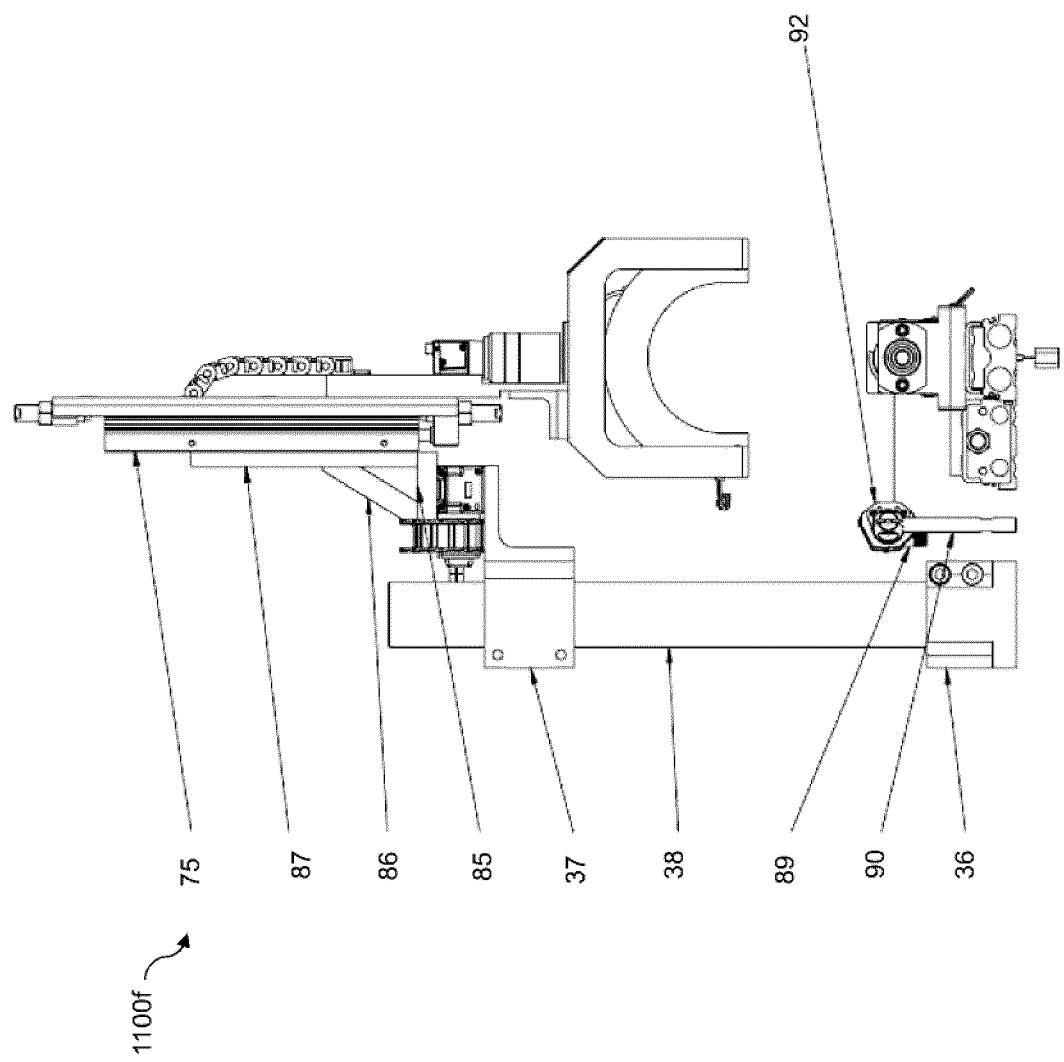
FIG. 11F is a side view of the mechanical inspection subsystem of FIG. 11A, according to an embodiment.
Figure 11G:
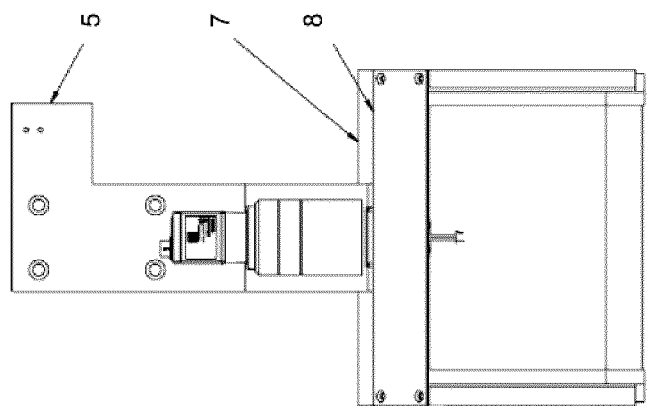
FIG. 11G is a front view of an imaging unit of the mechanical inspection subsystem of FIG. 11A, according to an embodiment.
Figure 11H:
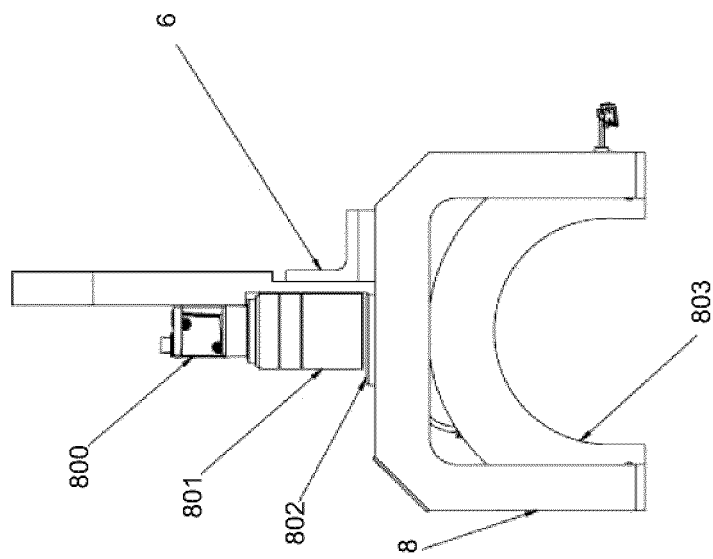
FIG. 11H is a side view of the imaging unit of FIG. 11A, according to an embodiment.
Figure 11I:
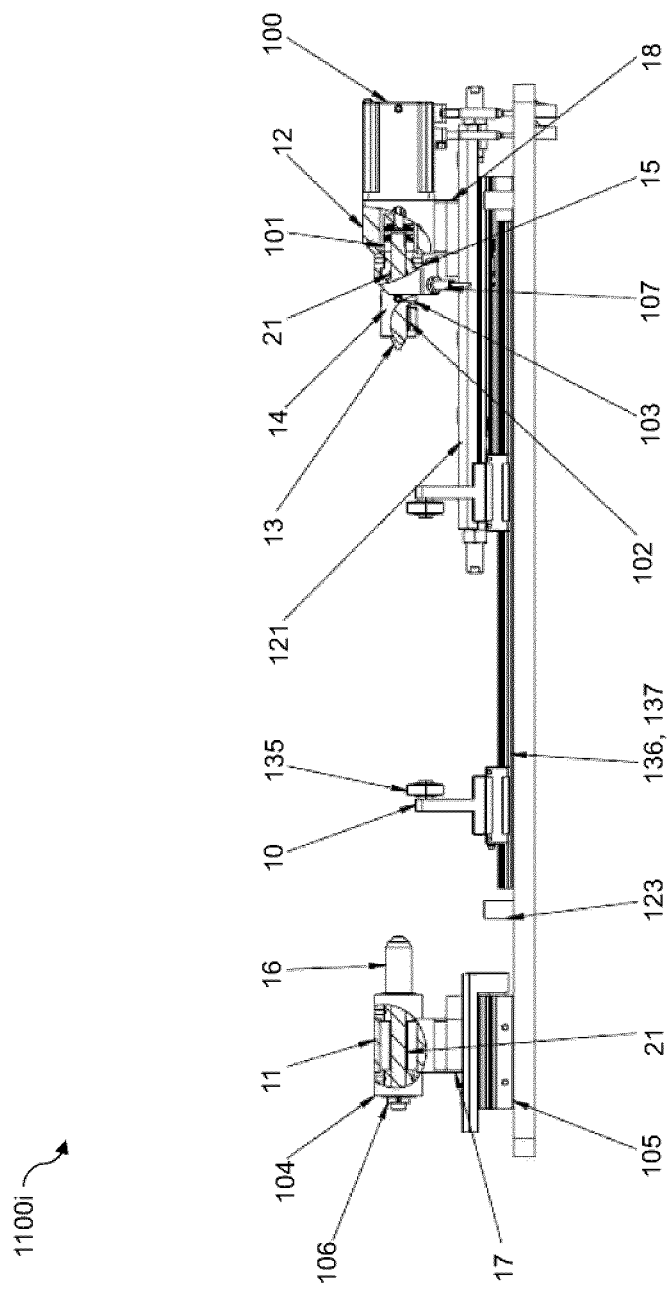
FIG. 11I is a front view of an article holder and article manipulator of the mechanical inspection subsystem of FIG. 11A, according to an embodiment.

At 424, a rotational movement motor (motor 2) of the second article manipulator 120b rotates to engage a pin in the article 110 into a keyway (e.g. item 14 of FIG. 11I).

At 426, the camera 128 is moved down then left until the camera 128 reaches a first inspection position.

At 428, the rotational movement motor (motor 2) of the second article manipulator 120b starts to inch the article 110 in steps. For each step, inspection code is sent to the node device 148 to start object detection. In other embodiments, the inspection code may be sent to the node device 148 at the completion of a predetermined number of rotation steps (e.g. at completion of a 360-degree revolution). In such an embodiment, object detection may be performed on a stitched image constructed from a plurality of images corresponding to the steps.

At 430, images are captured of the article 110. The images are analyzed by the node device 148 using AI algorithms to detect defects in the images (e.g. via defect detection model 154).

At 432, the rotational movement motor (motor 2) of the second article manipulator 120b keeps rotating the article 110 360 degrees while the article 110 is being imaged by the camera 128.

At 434, the camera 128 is moved to a second inspection position and the rotational movement motor (motor 2) of the second article manipulator 120b rotates the article 110 another 360 degrees. In an embodiment, the camera 128 (imaging unit 122) is moved via a stepper motor. In another embodiment, the camera 128 (imaging unit 122) is moved using a robotic arm (e.g. robotic arm 1484 of FIG. 14).

At 436, inspection continues, moving to successive inspection positions and performing inspection until inspection of each section of the article 110 is completed.

At 438, the PLC 146 sends a finish code to the node device 148. The finish code instructs the node device 148 to terminate detection until a new article 110 is loaded onto the article holder 118.

At 440, each time the node device 148 finds a defect, the node device 148 sends defect data including a defect type (e.g. porosity, sludge, etc.) and a defect size to the PLC 146.

If a defect is found, an NG code is sent from the node device 148 to the PLC 146.

If no defect is found, an OK code is sent from the node device 148 to the PLC 146. The OK code indicates that no defect has been identified in the section of the article 110 being inspected.

At 442, the PLC 146 determines whether the defect is an NG (no good, confirm defect) or OK (reject defect) using the received defect data and defect specifications stored at the PLC 146. The defect specifications include tolerances for specific sections of the article 110 linked to a horizontal section value and an angle value.

The PLC 146 makes the determination based on a horizontal reading identifying the section, which may be provided from a horizontal movement motor (e.g. stepper motor 1 for moving the imaging unit 122 including the camera 128), and a rotational reading from the rotational movement motor (stepper motor 2) of the second article manipulator 120b, which identifies an article angle (in reference to the pin/keyway). The PLC 146 determines if the defect is NG or OK according to the defect specification for the specific section/angle combination.

At 444, if the PLC determines that the part is NG, the system 100 stops and alarms. The stopping and/or alarming is performed according to a stop command and an alarm command generated by the PLC 146. For example, the PLC 146 may generate an alarm command and transmit the alarm command to an alarm system configured to generate or output an alarm upon receipt of the alarm command.

At 446, if the PLC 146 determines the article 110 is OK, either by receiving an OK code from the node device 148 or by determining a defect identified by the node device 148 is within an allowed range/tolerance, the inspection continues.

At 448, the imaging unit 122 and article manipulators 120a, 120b go to a home position in a reverse order. This may include the first actuator (center 1) moving to the left, the second actuator (center 2) moving to the right, and the imaging unit 122 moving to the right and up.

At 450 the inspected article 110 is unloaded from the article holder 118.

At 452, a new article 110 is loaded onto the article holder 118.

In an embodiment, when the PLC 146 determines that the article 110 is NG, the imaging unit manipulator 132 (or robotic arm) moves the camera 128 to an article identifier position wherein an article identifier on the camshaft is within the imaging zone 124 of the camera 128. An image of the article identifier can be captured by the camera 128. The article identifier is a unique identifier on the article 110 (e.g. etched onto the article 110).

In an embodiment, the article identifier is a 2D data matrix. The 2D data matrix may be similar to a QR code. The article 110 is rotated to bring the 2D matrix parallel to the camera 128 so that the detected defect (e.g. defect data) can be associated with a serial number (article identifier) of the article 110. The defect and serial number can be saved to a database. The defect and serial number may be linked in the database. Storage of such data may advantageously provide a record of what specific articles were found defective and why. Such data may also be used as input in a defect detection analytics process to determine trends or root causes of defects.

Figure 5:
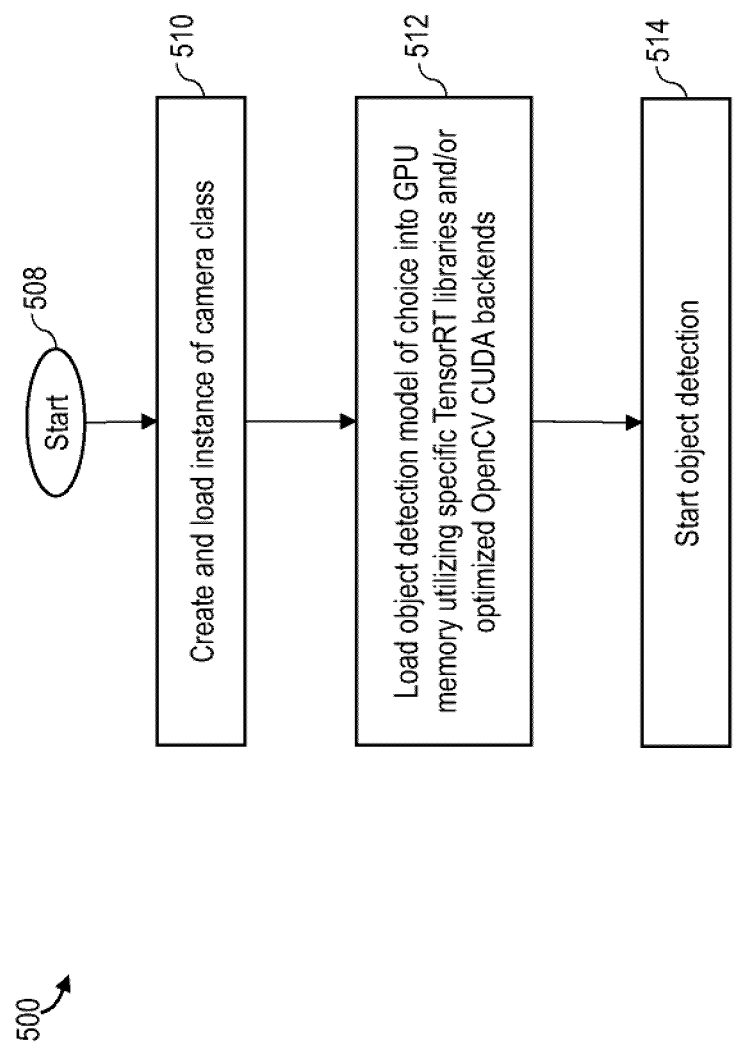
FIG. 5 is a flowchart of a method of running the network 156 of the node device 148 of FIG. 1 in real-time, according to an embodiment.

Referring now to FIG. 5, shown therein is a method 500 of running the network 156 of the node device 148 of FIG. 1 in real-time, according to an embodiment. The method 500 may be implemented by the node device 148.

At 508, the method starts.

At 510, the node device 148 creates and loads an instance of the Basler Camera class (software API is provided by Basler on their open source github).

At 512, the object detection model of choice is loaded into the GPU memory utilizing specific Tensor® libraries and/or optimized openCV CUDA backends.

At 514, object detection is started.

Figure 6:
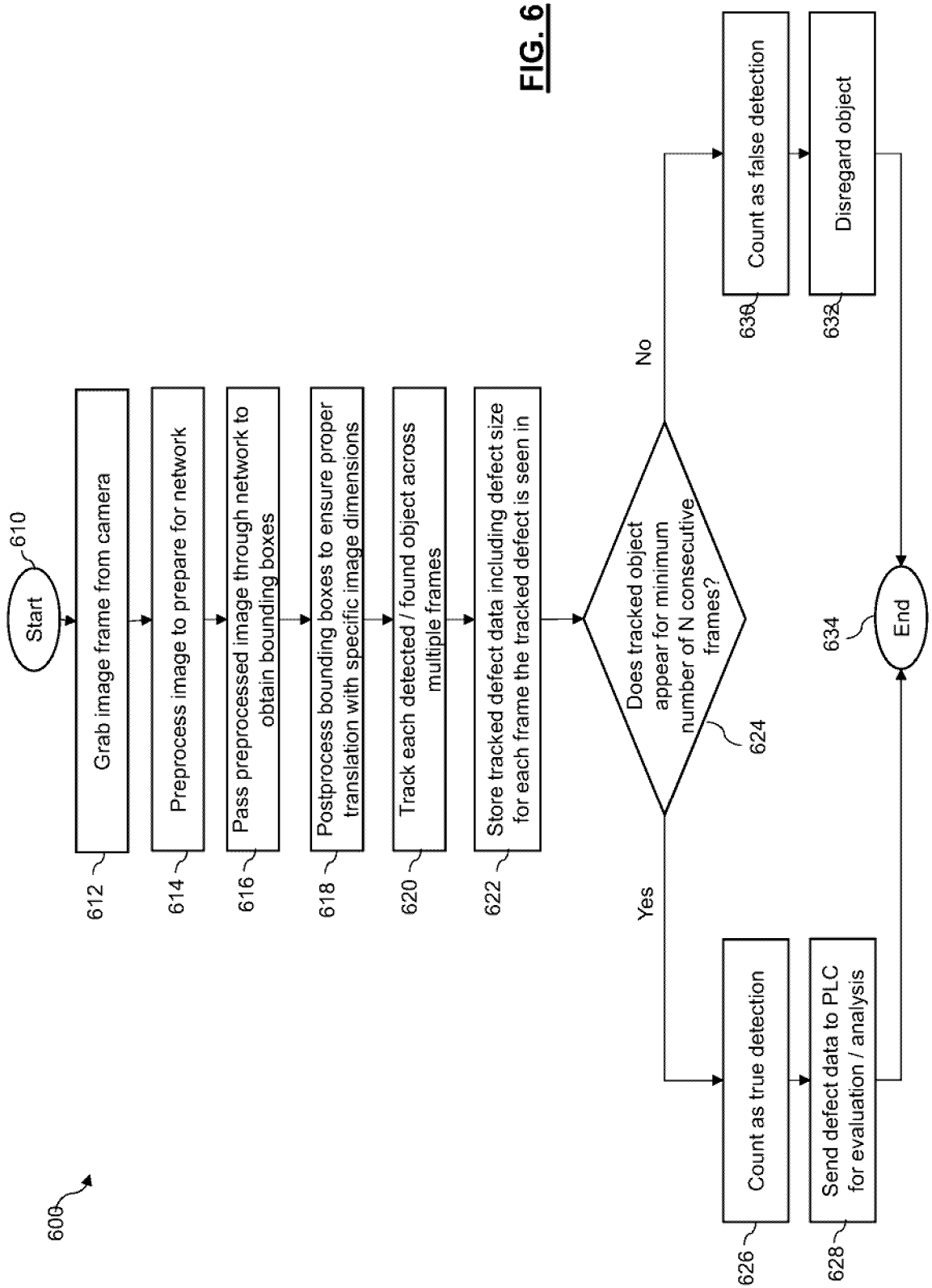
FIG. 6 is a flowchart of a method of object detection performed by the visual inspection system of FIG. 1, according to an embodiment.

Referring now to FIG. 6, shown therein is a method of object detection 600 performed by the visual inspection system 100, according to an embodiment. The method 600 may be performed by the node device 148 of FIG. 1.

The method 600 may be implemented at step 514 of the method 500 of FIG. 5.

At 610, the method starts.

At 612, an image frame is grabbed from the camera 128.

At 614, the grabbed image is preprocessed. Preprocessing is done to get the image ready for the network 156.

Preprocessing the image may include any one or more of cropping, converting to a numpy array, changing pixel values to int8 format, changing BGR format to RGB format, and resizing using Bilinear interpolation.

At 616, the preprocessed image is passed through the neural network 156. Passing the image through the network 156 generates bounding boxes with classes and confidence scores. The bounding box encloses an object (defect) located in the image. The class corresponds to a defect type.

At 618, the bounding boxes obtained at 614 are post-processed to make sure they translate properly with specific image dimensions when the image is up-scaled back to its original size after the resizing in the preprocess function.

At 620, the node device 148 keeps track of each object detected. This includes tracking a detected defect across a plurality of image frames. Tracking the defect in this manner may provide greater certainty that the detected defect is in fact a defect and not a one-off incorrect detection.

Tracking may allow the algorithms to reduce false positive detections and random one-off detections.

At 622, while tracking each individual defect, size information for the tracked defect is stored over every frame in which the defect is seen.

At 624, the node device 148 determines whether the tracked object appears for a minimum number of N consecutive frames without dropping a single frame.

At 626, if the tracked object has been seen for a minimum number of N consecutive frames without dropping a single frame, the detected object is counted as a true detection.

Once the detection is considered a true detection, an average size for the defect is calculated using the size information across all the frames in which the defect appeared. This technique may reduce the variance from the bounding box sizing.

At 628, the defect data for the true detection is sent to the PLC 146. Defect data may include any one or more of defect size, defect location and defect class. The defect data may be sent from the node to the PLC 146 via TCP/IP over a socket.

When the defect data is received by the PLC, the PLC makes note of the stepper motor angle and relates the defect size to the tolerance on that particular section (with regards to rotation) and location of the article 110.

The defect location is transmitted to the PLC 146 with bounding box coordinates x0,y0,x1,y1. The PLC 146 can use the defect location information to pinpoint where on that specific section (e.g. specific lobe or journal of a camshaft being inspected) the defect was found.

At 630, if the tracked object has not been seen for the minimum number of N consecutive frames, the detection is counted as a false detection.

At 632, the object that is subject to the false detection is disregarded (i.e. the defect data is not sent to the PLC).

At 634, the process ends. Steps 612 to 632 may be repeated until inspection of the article 110 is complete.

Referring now to FIGS. 7 to 10, shown therein are example visual inspection images generated by an embodiment of the visual inspection system 100 of FIG. 1. The embodiment of system 100 has been configured to image camshafts and detect paint and porosity defect types therein.

The images represent images that have been acquired by the imaging unit 122, processed by the node device 148 using object detection techniques to detect and classify defects, and displayed via the user control device 150. The images may be stored by the node device 148 and/or user control device 150 for further review and analysis.

Image 700, 800, 900, 1000 may be displayed to an operator of the system 100 via the user control device 150.

Figure 7:
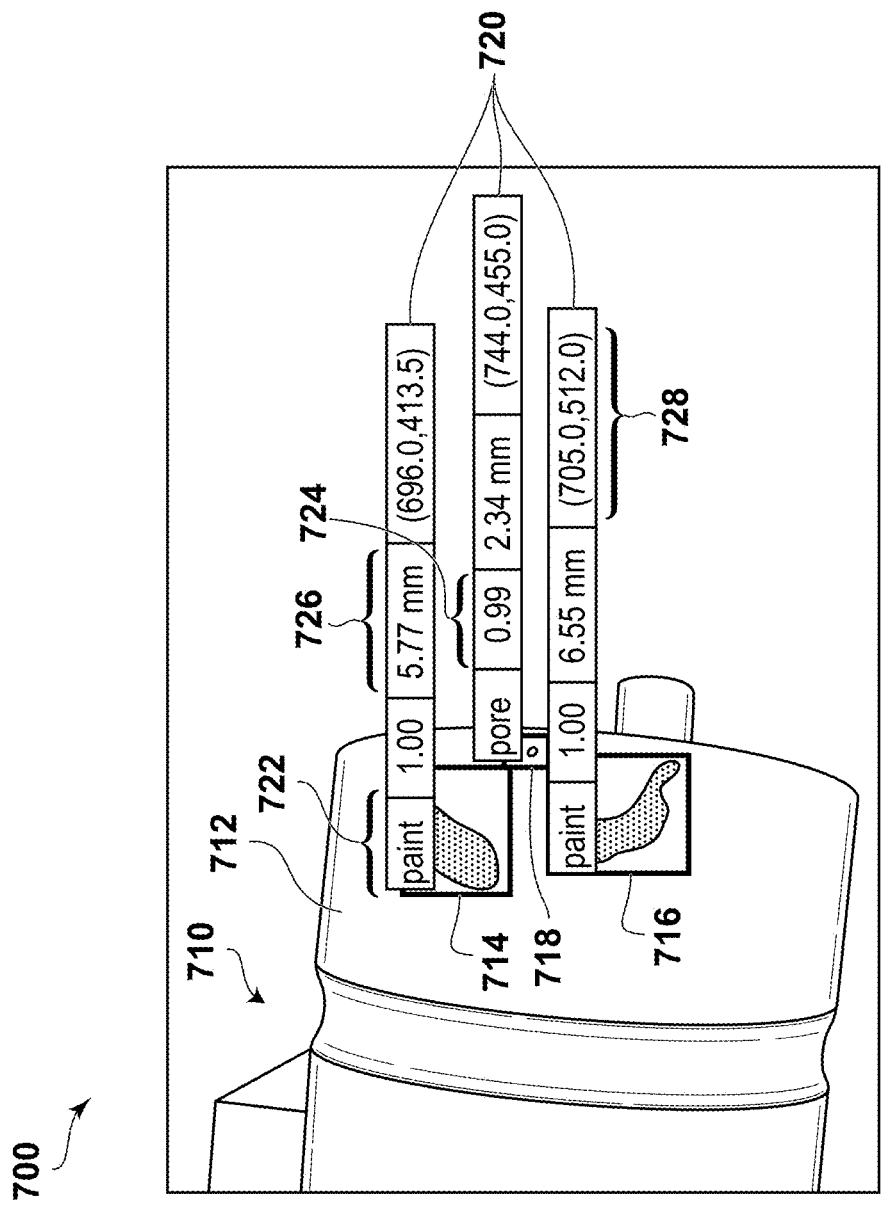
FIG. 7 is an example image of an inspected camshaft generated by the visual inspection system of FIG. 1, according to an embodiment.

Image 700 of FIG. 7 shows a camshaft 710 (i.e. article 110 of FIG. 1) that has been inspected by the system 100 of FIG. 1. In particular, image 700 shows results of a visual inspection operation performed on a section 712 of the camshaft 710. The section 712 corresponds to an article section as described in reference to article 110 of FIG. 1. The system 100 is configured to detect paint and porosity defects.

The system 100 has identified three defects in the camshaft 710 based on the image data captured thereof. The defects are enclosed by bounding boxes 714, 716, and 718. The defects include a first paint defect contained in bounding box 714, a second paint defect contained in bounding box 716, and a porosity defect contained in bounding box 718.

The bounding boxes 714, 716, 718 are generated by the node device 148 during object detection.

As shown, the user control device 150 may be configured to associate a unique colour indicator with each different defect type. For example, bounding boxes enclosing a particular defect type may be given a particular colour. This may allow a user to more easily identify and distinguish different types of defects present in the image 700. In the example of image 700, a green colour is associated with displayed information relating to a paint defect type and a red colour is associated with displayed information relating to a porosity defect type. Other embodiments may utilize other types of unique indicators for distinguishing between defect types.

Each defect in the image 700 has defect data 720 associated therewith.

The defect data 720 is generated and stored by the node device 148 during the object detection process. The defect data 720 may be passed from the node device 148 to the user control device 150. The user control device 150 stores the defect data 720 and is configured to generate a visualization displaying the defect data 720.

In image 700, the user control device 150 displays the defect data 720 such that the defect data 720 is linked with the bounding box of the same defect, making it easy for the user to identify the defect data 720 relating to a particular identified defect.

The defect data 720 includes a defect type (or class) 722, a defect confidence level 724, a defect size 726, and a defect location 728. Variations of the system 100 may include more or fewer types of defect data 720. This information may be used by the PLC 146 to understand how to compare each respective defect to the predefined camshaft defect tolerances.

The defect type 722 includes the type of defect detected. Defect types in image 700 include paint defect type and porosity defect type.

The defect confidence level 724 represents a confidence level for the object detection and classification (i.e. for the assignment of the defect type 722 to the defect).

The defect size 726 indicates the size of the defect in a particular unit of measurement. The defect sizes 726 in image 700 are in millimeters.

The defect location 728 indicates the location of the defect. The defect location includes (x,y) coordinates.

It may be important to have the operator view the defects in real-time as the AI during the early stages of inspection when the AI is still gaining confidence detecting the defects. As the AI inspects more parts, it collects and learns how to identify more defects with more confidence. There may come a point where the AI no longer needs to be watched by the human, because the AI performance far surpasses human capability.

Figure 8:
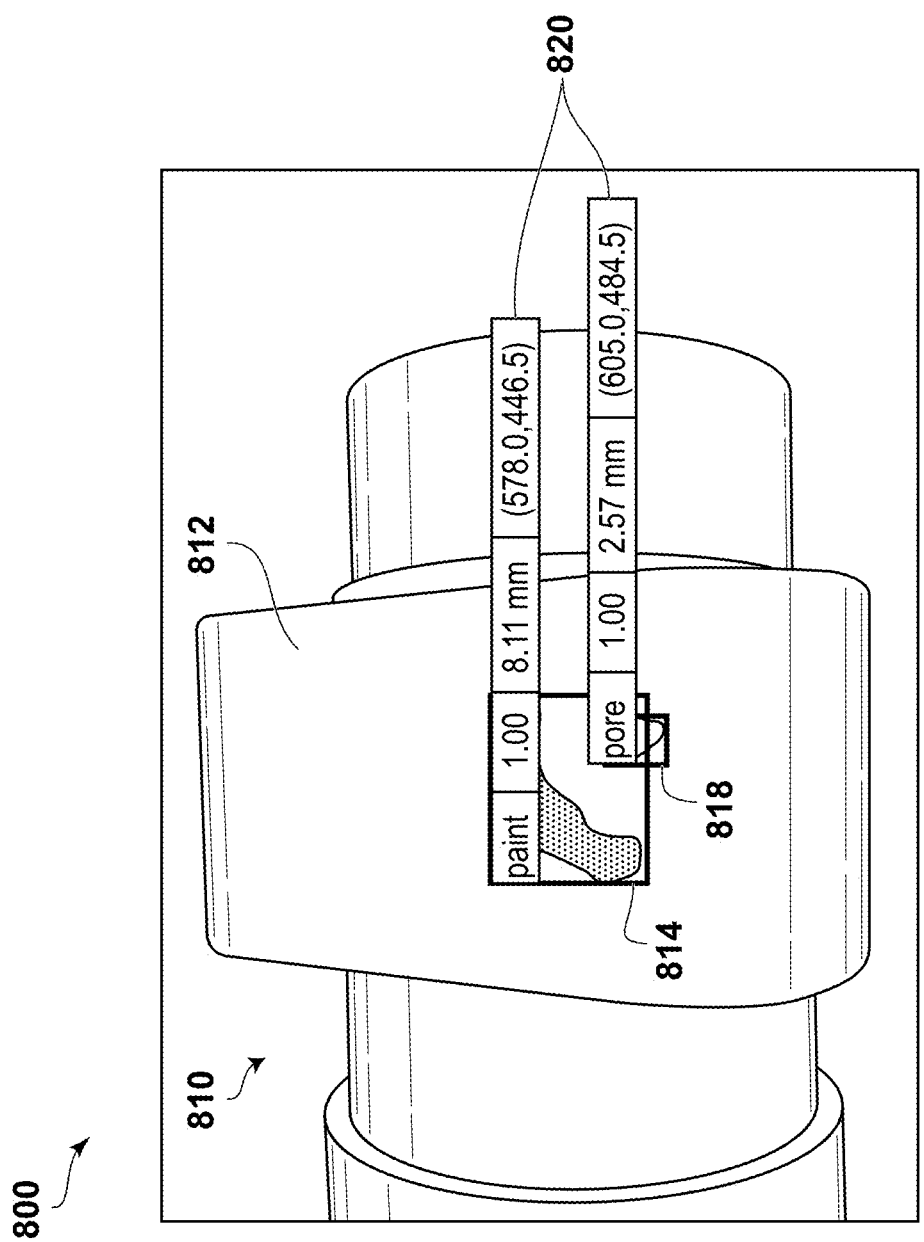
FIG. 8 is an example image of an inspected camshaft generated by the visual inspection system of FIG. 1, according to an embodiment.

Image 800 of FIG. 8 shows another camshaft 810 that has been inspected by the embodiment of system 100 used to generate image 700 of FIG. 7. In particular, image 800 shows results of a visual inspection operation performed on a section 812 of the camshaft 810.

Image 800 shows a paint defect and a porosity defect in the section 812. The paint defect is outlined by a first bounding box 814. The porosity defect is outlined by a second bounding box 818.

The paint defect and porosity defect each have defect data 820 associated with them. The defect data 820 is generated by the node device 148 during object detection.

Figure 9:
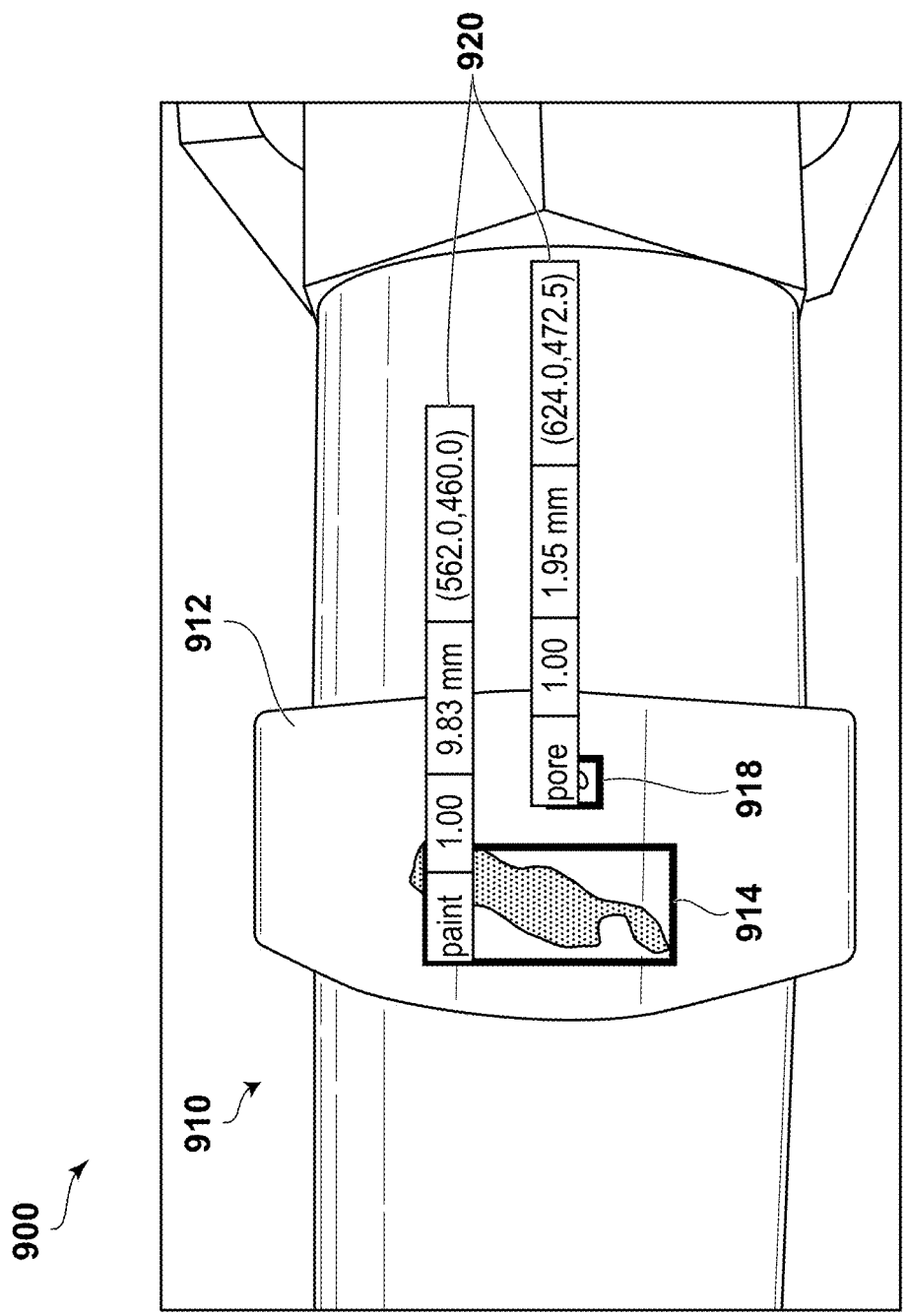
FIG. 9 is an example image of an inspected camshaft generated by the visual inspection system of FIG. 1, according to an embodiment.

Image 900 of FIG. 9 shows yet another camshaft 910 that has been inspected by the system 100 of FIG. 1. In particular, image 900 shows results of a visual inspection operation performed on a section 912 of the camshaft 910.

Image 900 shows a paint defect and a porosity defect in the section 912. The paint defect is outlined by a first bounding box 914. The porosity defect is outlined by a second bounding box 918.

The paint defect and porosity defect each have defect data 920 associated therewith. The defect data 920 is generated by the node device 148 during object detection.

Figure 10:
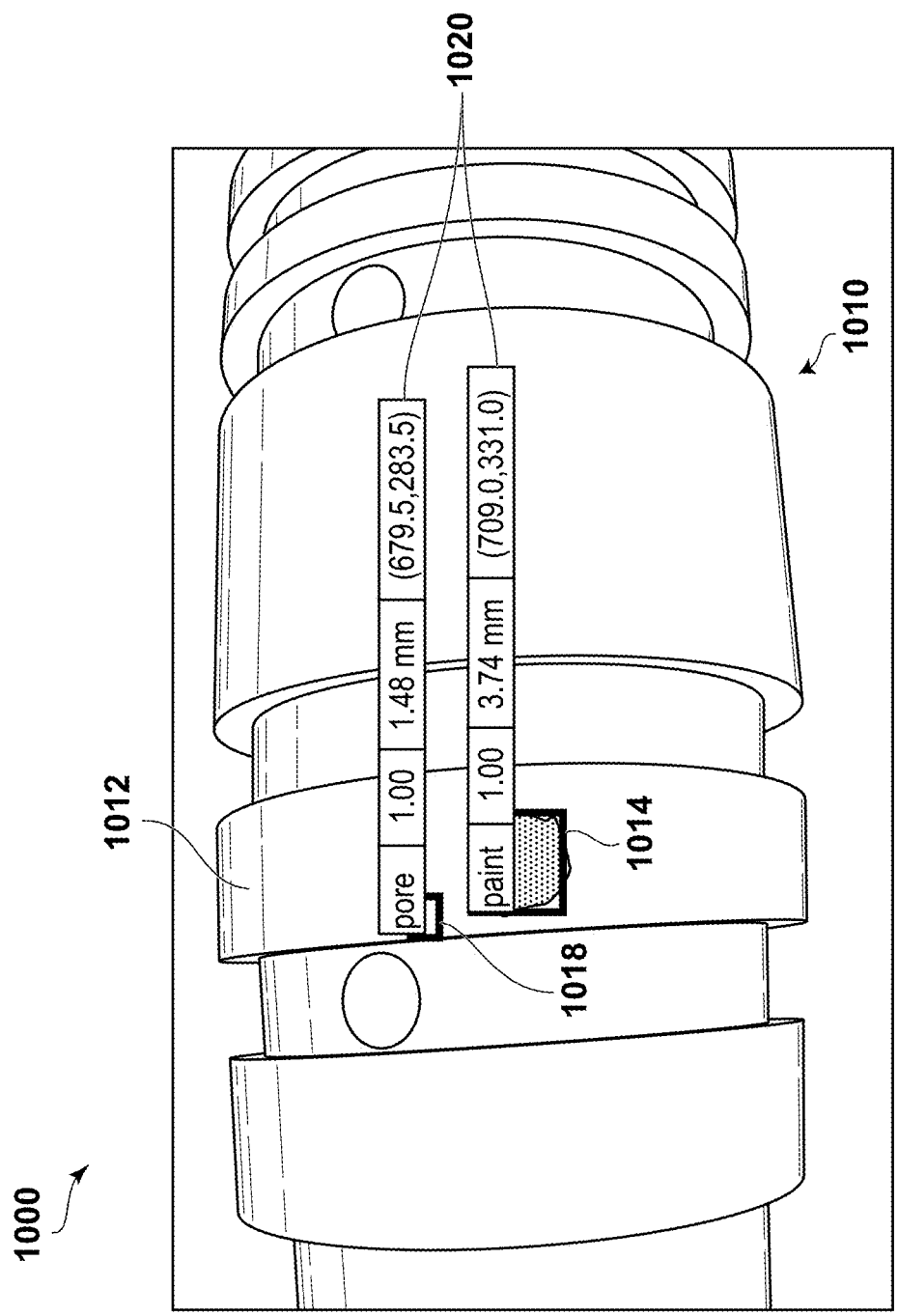
FIG. 10 is an example image of an inspected camshaft generated by the visual inspection system of FIG. 1, according to an embodiment.

Image 1000 of FIG. 10 shows yet another camshaft 1010 that has been inspected by the system 100 of FIG. 1. In particular, image 1000 shows results of a visual inspection operation performed on a section 1012 of the camshaft 1010.

Image 1000 shows a paint defect and a porosity defect in the section 1012. The paint defect is outlined by a first bounding box 1014. The porosity defect is outlined by a second bounding box 1016.

The paint defect and porosity defect each have defect data 1020 associated with them. The defect data 1020 is generated by the node device 148 during object detection.

Referring now to FIGS. 11A to 11I, shown therein are multiple views of a mechanical inspection subsystem of a visual inspection system of the present disclosure, according to an embodiment. The visual inspection system is adapted to inspect camshafts. The visual inspection system 100 may be an embodiment of the visual inspection system 100 of FIG. 1. The mechanical inspection subsystem may be the mechanical inspection subsystem 114 of FIG. 1. The mechanical inspection subsystem of FIGS. 11A to 11I can be communicatively connected to a computing system, such as computing system 116 of FIG. 1, that is configured to perform visual inspection according to the techniques described herein.

Reference numerals provided in FIGS. 11A to 11I correspond to parts numbers found in the parts table 1100*j* of FIG. 11J.

FIG. 11A shows a first perspective view 1100*a* of a mechanical inspection subsystem, according to an embodiment.

FIG. 11B shows a second perspective view 1100*b* of the mechanical inspection subsystem of FIG. 11A, according to an embodiment.

FIG. 11C shows a top view 1100*c* of the mechanical inspection subsystem of FIG. 11A, according to an embodiment.

FIG. 11D shows a front view 1100*d* of the mechanical inspection subsystem of FIG. 11A, according to an embodiment.

FIG. 11E shows a back view 1100*e* of the mechanical inspection subsystem of FIG. 11A, according to an embodiment.

FIG. 11F shows a side view 1100*f* of the mechanical inspection subsystem of FIG. 11A, according to an embodiment.

FIG. 11G shows a front view 1100*g* of an imaging unit of the mechanical inspection subsystem of FIG. 11A, according to an embodiment. The imaging unit may be the imaging unit 122 of FIG. 1.

FIG. 11H shows a side view 1100*h* of the imaging unit of FIG. 11A, according to an embodiment.

FIG. 11I shows a front view 1100*i* of an article holder and article manipulator of the mechanical inspection subsystem of FIG. 11A, according to an embodiment. The article holder may be article holder 118 of FIG. 1. The article manipulator may be the article manipulator 120 of FIG. 1.

FIG. 11J shows a parts table 1100*j* for the mechanical inspection subsystem of FIG. 11A, according to an embodiment.

Figure 12:
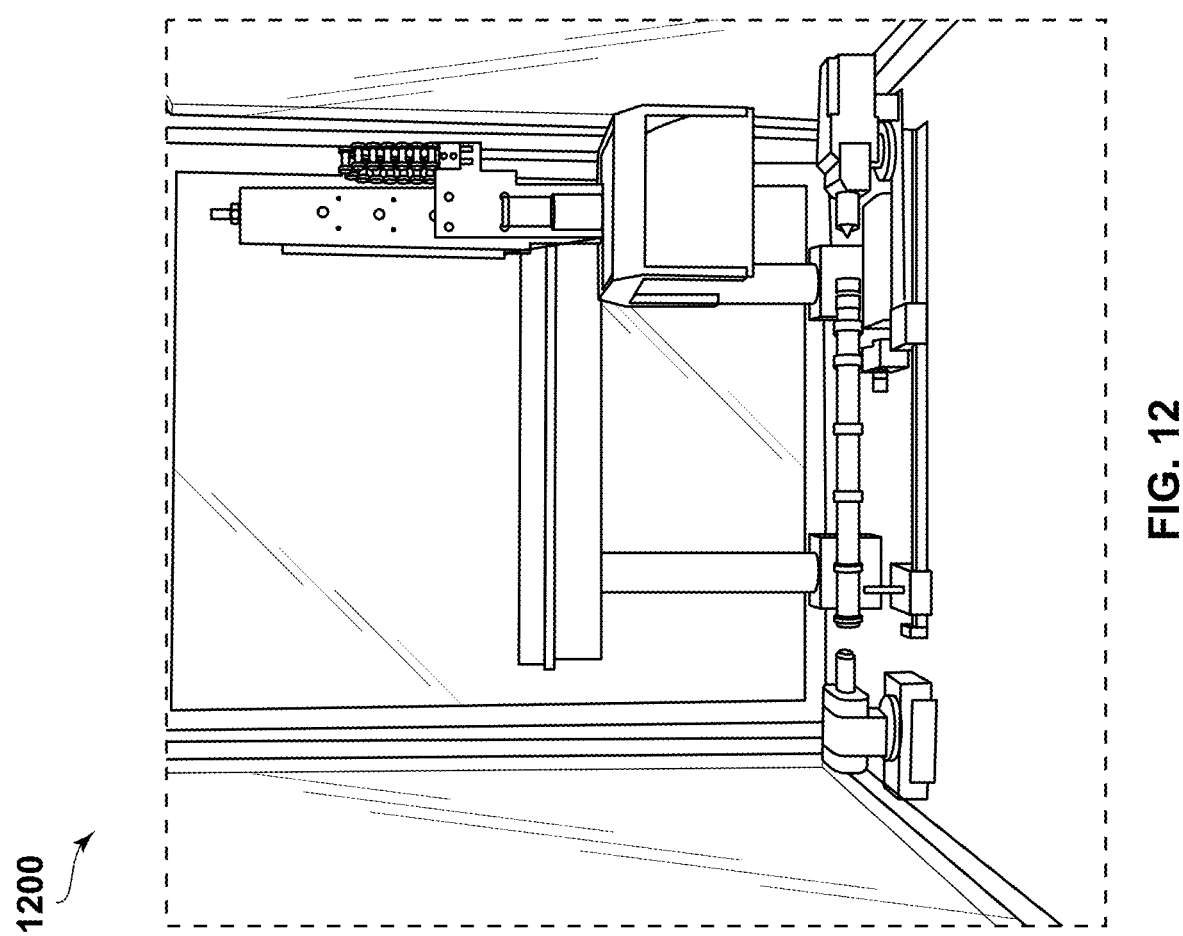
FIG. 12 is a front view of a mechanical inspection subsystem of the present disclosure, according to an embodiment.

Referring now to FIG. 12, shown therein is a front view 1200 of a mechanical inspection subsystem of the present disclosure, according to an embodiment. The mechanical inspection subsystem may be the mechanical inspection subsystem 114 of FIG. 1.

Figure 13:
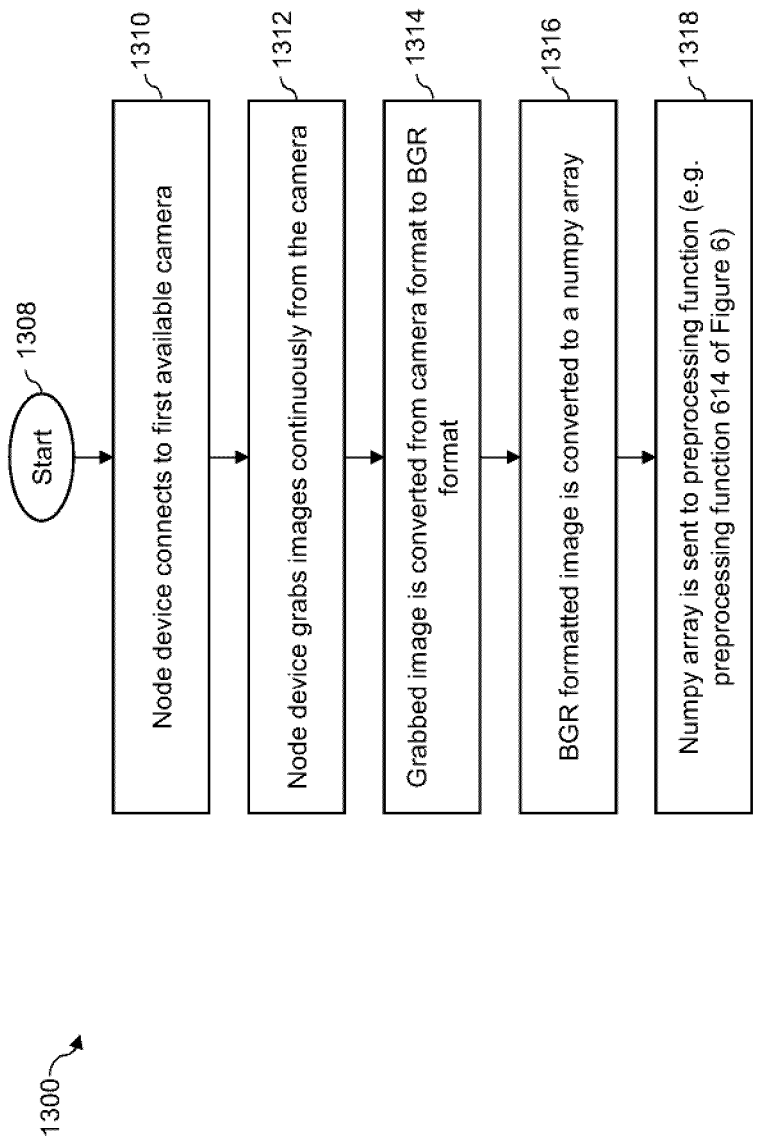
FIG. 13 is a flowchart of a method of real-time streaming video analysis, according to an embodiment.
Figure 14A:
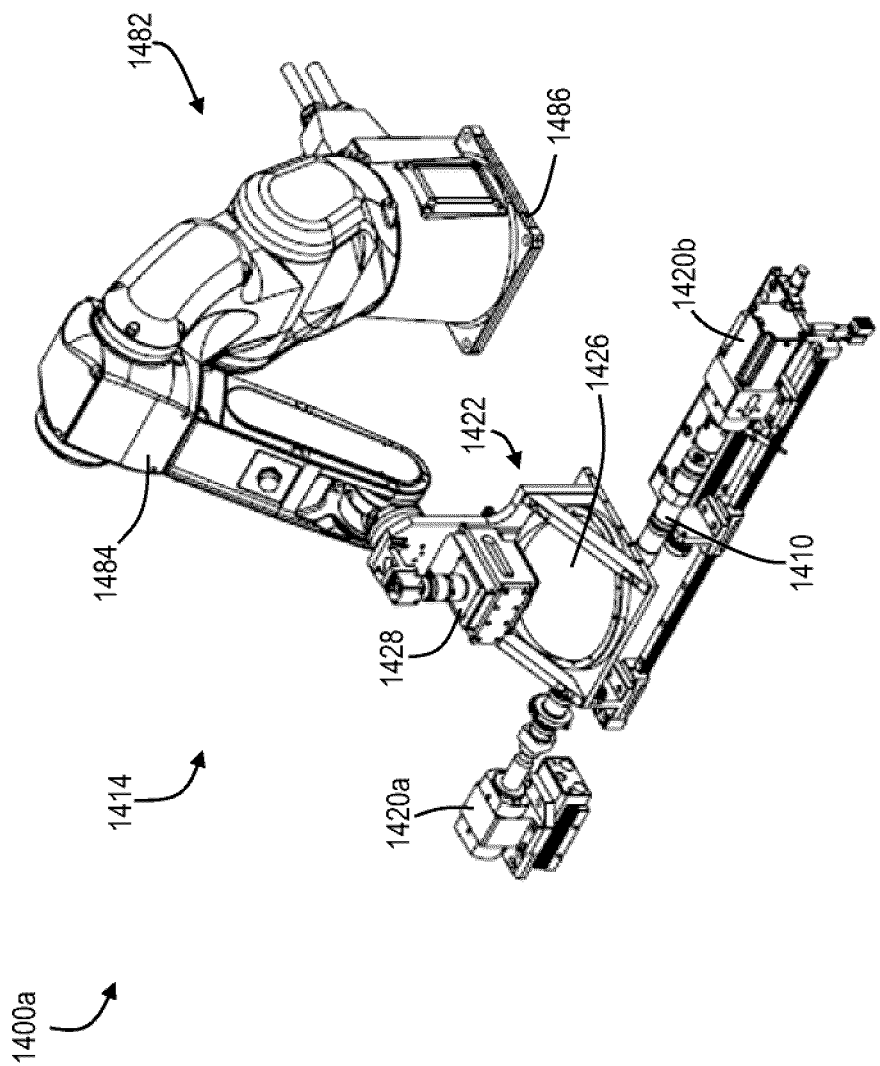
FIG. 14A is a perspective view of a mechanical inspection subsystem using robotic automation, according to an embodiment.
Figure 14B:
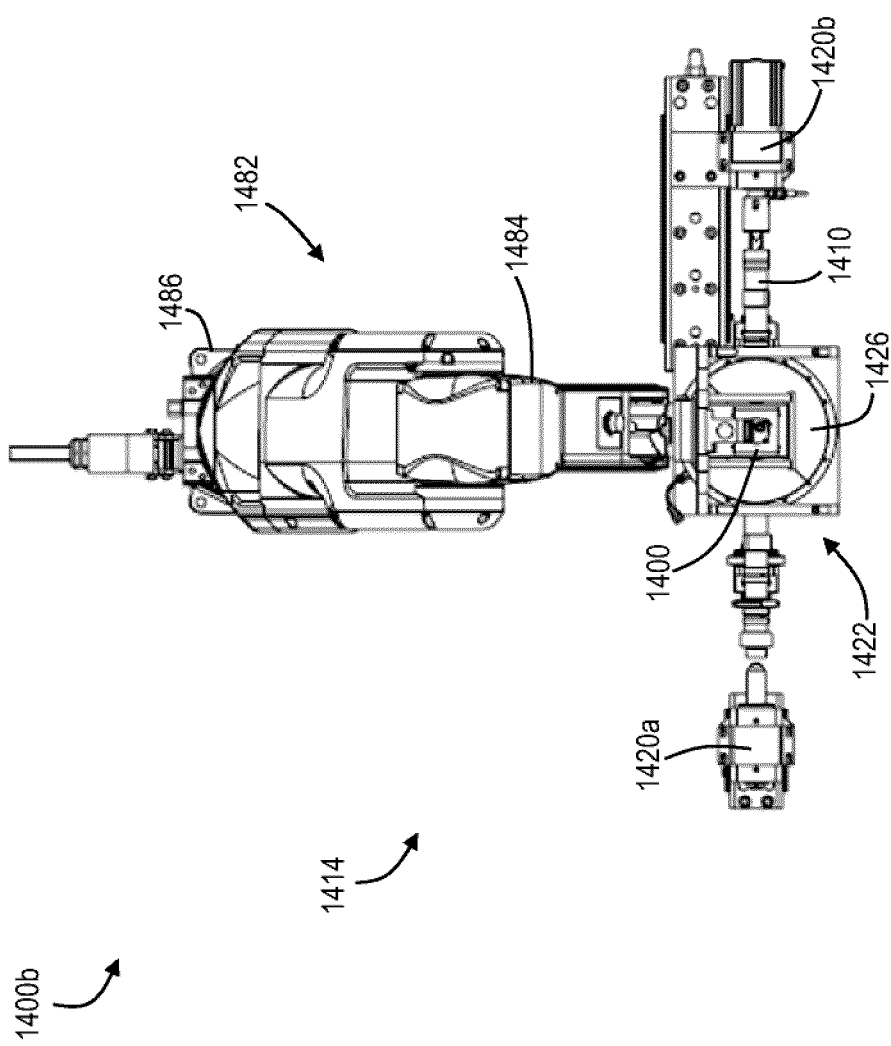
FIG. 14B is a top view of the mechanical inspection subsystem of FIG. 14A.
Figure 14C:
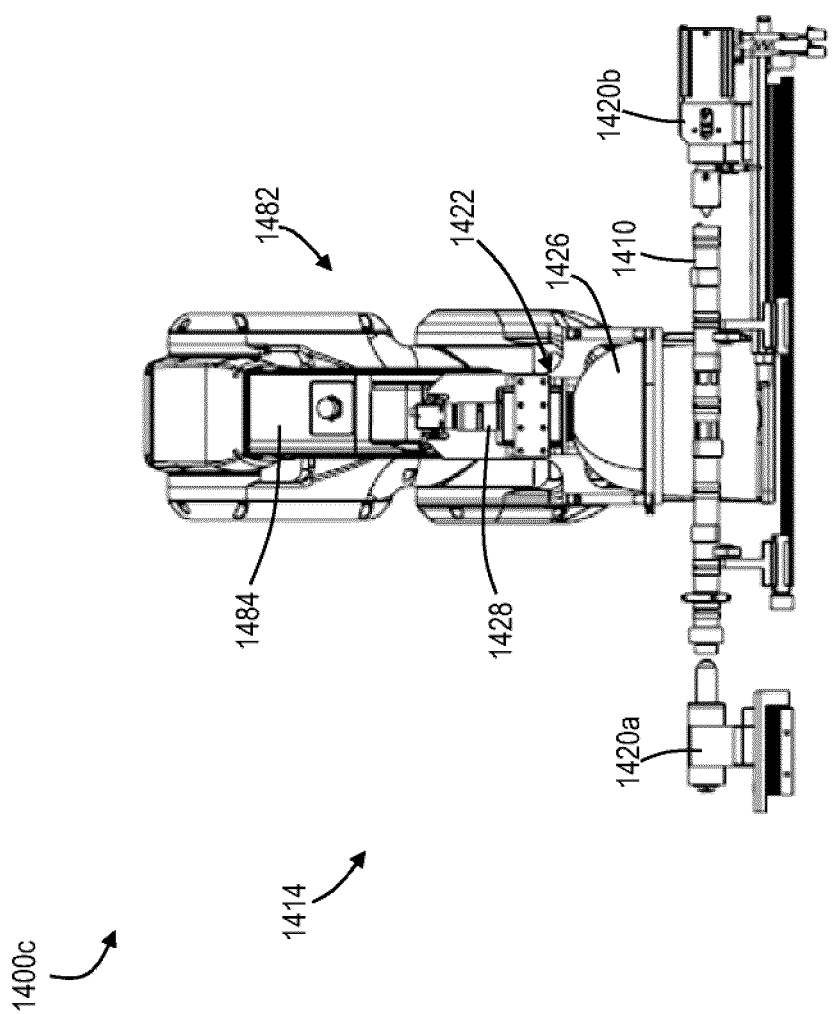
FIG. 14C is a front view of the mechanical inspection subsystem of FIG. 14A.
Figure 14D:
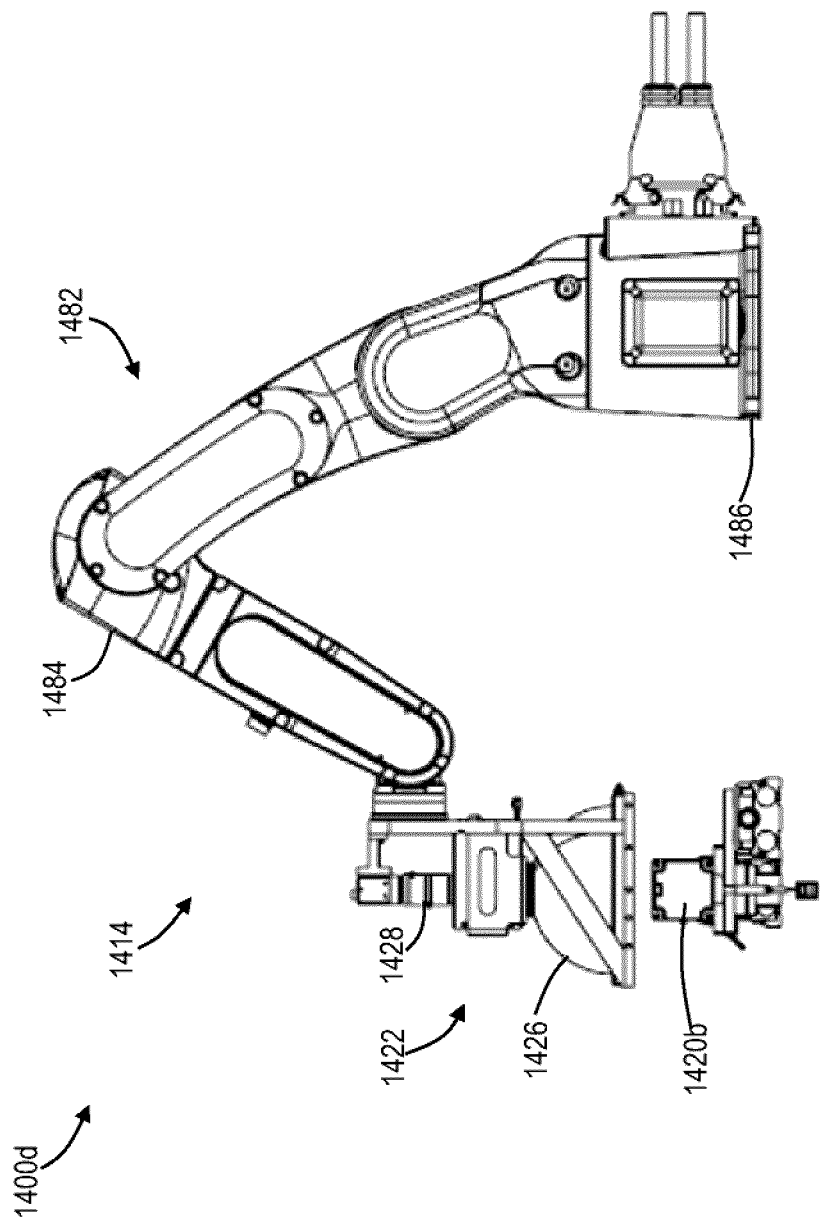
FIG. 14D is a side view of the mechanical inspection subsystem of FIG. 14A.

Referring now to FIG. 13, shown therein is a method 1300 of real-time streaming video analysis, according to an embodiment. The method 100 may be performed by the visual inspection system 100 of FIG. 1.

At 1308, the method 1300 starts.

At 1310, the node device 148 connects to the first available camera 128. This may include looking on an available usb 3.0 (or other interface) and seeing if any cameras are connected.

The node device 148 may connect to the camera 128 via a camera API.

The camera API is a set of specifications allowing application software on the node device 148 to communicate with the camera 128.

In an embodiment wherein the camera 128 is a Basler camera, the node device 148 connects to the first available Basler camera via a Pylon™ API. The Basler Pylon camera software suite is a collection of drivers and tools for operating the Basler camera.

At 1312, the node device 148 grabs images continuously from the camera 128. The images grabbed from the camera 128 by the node device 148 are in a bit map format, which is then converted into a numpy array format with BGR channel ordering utilized by OpenCV.

At 1314, the grabbed images are converted from the camera format to another format suitable for use with OpenCV or the like. In an embodiment, the grabbed images are converted from a Basler camera format to OpenCV BGR format.

At 1316, the OpenCV BGR formatted image data is converted to a numpy array. The numpy array may provide smaller memory consumption (numpy data structures may take up less space) and better runtime behavior.

At 1318, the numpy array is sent to a preprocessing function for pre-processing. For example, the numpy array may be sent to preprocessing function 614 of FIG. 6 and further processed according to the method 600 of FIG. 6.

The pre-processing function preprocesses the image to prepare the image for the neural network 156. The preprocessing may include any one or more of cropping, converting to a numpy array, changing pixel values to int8 format, changing BGR format to RGB format, and resizing using bilinear interpolation.

Referring now to FIGS. 14A to 14D, shown therein are perspective, top, front, and side views 1400a, 1400b, 1400c, 1400d, respectively, of a mechanical inspection subsystem 1414 for use in a visual inspection system, according to an embodiment. The mechanical inspection subsystem 1414 uses robotic automation.

The mechanical inspection subsystem 1414 may be used as the mechanical inspection subsystem 114 of FIG. 1.

Elements of FIGS. 14A to 14D may have counterpart elements described in FIG. 1. If an element of the mechanical inspection subsystem 114 is referred to by reference number 1XX and this element has a counterpart in the mechanical inspection subsystem 1414, the counterpart element in the mechanical inspection subsystem 1414 is referred to by reference number 14XX (i.e. having the same last two digits as its counterpart in FIG. 1). Counterpart elements may perform the same or similar functions.

The mechanical inspection subsystem 1414 is communicatively connected to a computing system (e.g. computing system 116 of FIG. 1) to facilitate data transfer between the computing system and the mechanical inspection subsystem 1414 to perform visual inspection. The computing system 116 performs various control, analysis, and visualization functions, such as described herein.

The mechanical inspection subsystem 1414 includes a robotic subsystem 1482. The robotic subsystem 1482 includes a robotic arm 1484 and a robotic arm controller (not shown) for controlling movement of the robotic arm 1484. The robotic arm 1484 is configured to move according to commands from the robotic arm controller. The robotic subsystem 1482 includes a base 1486 for mounting the robotic arm 1484 to a surface. The surface may be on a stationary or mobile object.

The mechanical inspection subsystem 1414 includes an imaging unit 1422 attached to the robotic arm 1484. The imaging unit 1422 includes a camera 1428 and a lighting mechanism 1426.

The robotic arm 1484 is configured to move the imaging unit 1422 to capture images of an article 1410 under inspection. The robotic arm 1484 may be configured to move in three dimensions. During inspection, the article 1410 is engaged by article manipulators 1420a and 1420b. The article manipulators 1420a, 1420b facilitate the rotation of the article 1410 during inspection (e.g. such as along a line of motion similar to line of motion 125 of FIG. 1). By rotating the article 1410, the imaging unit 1422 can capture images of the entire article 1410.

In a particular case, during an inspection operation the robotic arm 1484 moves the imaging unit 1422 to a section of the article 1410 proximal to the article manipulator 1420a and captures a plurality of images representing a 360-degree imaging of that section of the article 1410 at that position. The robotic arm 1484 then moves the imaging unit 1422 to a second section of the article 1410 (i.e. the robotic arm 1484 moves the imaging unit 1422 further from article manipulator 1420a to image the second section) for similar 360-degree imaging at the second position. This process can be repeated along the length of the article 1410 (e.g. from an end proximal to article manipulator 1420a, to an end proximal to article manipulator 1420b).

Figure 15:
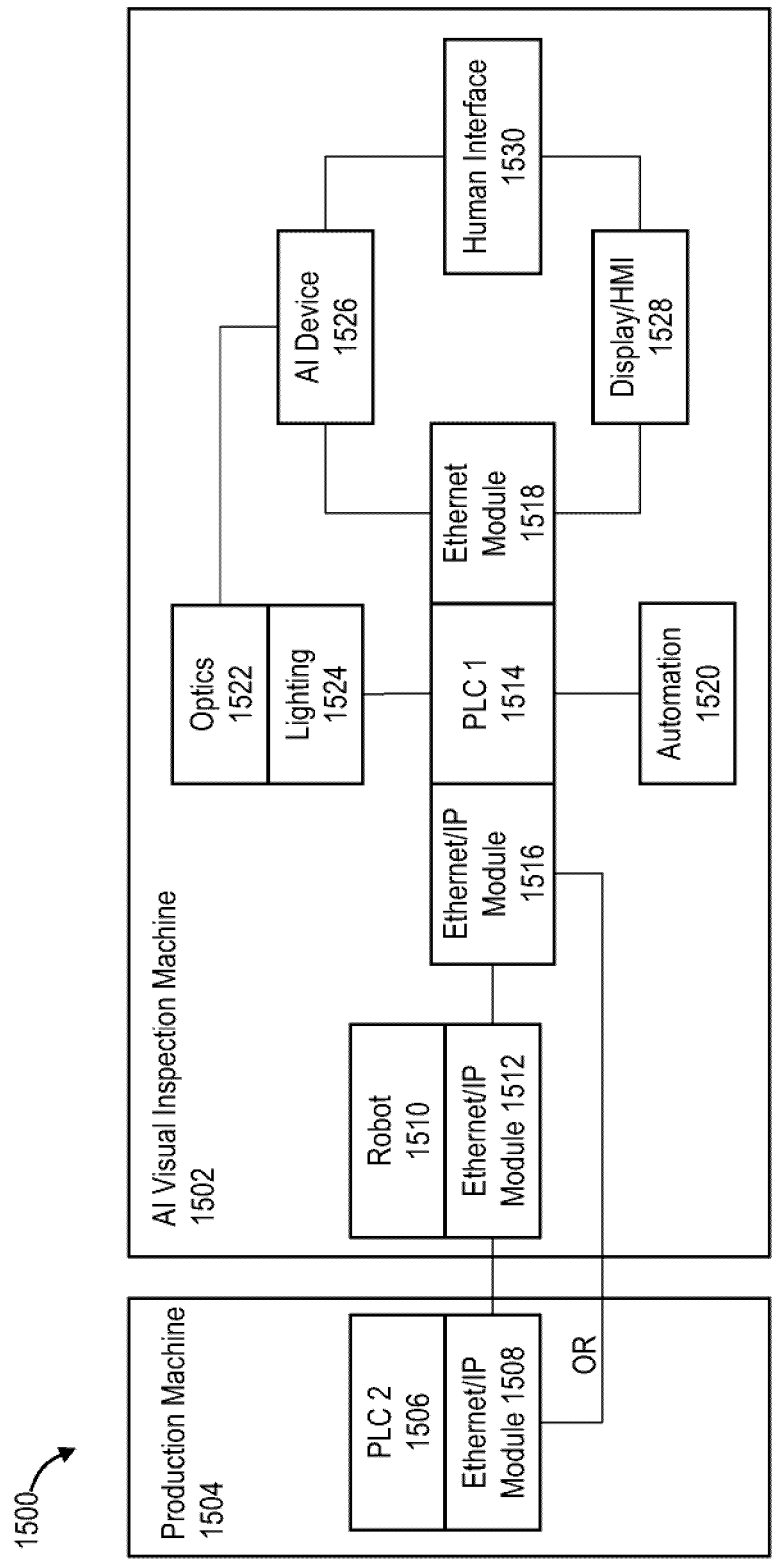
FIG. 15 is a block diagram illustrating communication between various components of a visual inspection system including a production machine and camshaft AI visual inspection machine, according to an embodiment.

Referring now to FIG. 15, shown therein is block diagram 1500 illustrating communication between components in a visual inspection system of the present disclosure, according to an embodiment. In FIG. 15, solid lines between components indicate data communication between the connected components. Such communication may be wired or wireless depending on the type of connection.

The visual inspection system includes an AI visual inspection machine 1502 and a production machine 1504. The production machine 1504 may be the last process performed on the article to be inspected. The production machine 1504 generates an output that is provided as input to the AI visual inspection machine 1502. The AI visual inspection machine 1502 may be the visual inspection system 100 of FIG. 1.

The production machine 1504 includes a PLC 1506 (denoted "PLC 2") and an Ethernet/IP module 1508. The Ethernet/IP module 1508 facilitates communication between the PLC 1506 and components of the AI visual inspection machine 1502. The PLC 1506 is a controller of the production machine 1504. The PLC 1506 communicates with PLC 1514 (described below) of the inspection machine 1502 for integration purposes (e.g. interface I/O signals) that facilitate proper operation of the production machine 1504 and the visual inspection machine 1502.

The AI visual inspection machine 1502 includes a robot 1510 and an Ethernet/IP module 1512. The robot 1510 may be the robotic subsystem 1482 of FIG. 14 and may include a robotic arm (e.g. robotic arm 1484) for manipulating an imaging unit of the AI visual inspection machine 1502. The Ethernet/IP module 1512 facilitates communication between the robot 1510 and components of the AI visual inspection machine 1502 and the production machine 1504. In particular, the Ethernet/IP module 1512 may communicate with the Ethernet/IP module 1508 to facilitate communication between the robot 1510 and the PLC 1506 of the production machine 1504. In some cases, the PLC 1506 may not need to communicate with the robot 1510. However, in some other cases, Ethernet/IP communications may not be feasible directly between the PLC 1506 of the production machine 1504 and the PLC 1514 of the visual inspection machine 1502 (e.g. between a Mitsubishi PLC and a Keyence PLC) and may thus be achieved through the robot 1510. In such cases, the robot 1510 may act as a medium through which signals can be transferred between the PLC 1506 and the PLC 1514.

The AI visual inspection machine 1502 also includes a PLC 1514 (denoted "PLC 1"). The PLC 1514 may be the PLC 146 of FIG. 1. The PLC 1514 communicates with other components of the AI visual inspection machine 1502 and production machine 1504 via an Ethernet/IP module 1516 and an Ethernet module 1518. In particular, the PLC 1514 communicates with the robot 1510 via communication between Ethernet/IP module 1516 and Ethernet/IP module 1512. The PLC 1514 may communicate with the PLC 1506 of the production machine 1504 via communication between Ethernet/IP module 1516 and Ethernet/IP module 1508.

The AI visual inspection machine 1502 also includes an automation component 1520. The automation component 1520 communicates directly with the PLC 1514. The automation component 1520 includes components responsible for automating the inspection process (e.g. components of a mechanical inspection subsystem, such as subsystem 114 of FIG. 1 or 1414 of FIG. 14). The automation components 1520 may include, for example, stepper motors, actuators (e.g. cylinders), sensors, etc. The automation components 1520 communicate with the PLC 1514 through direct hard-wired connections. The automation components 1520 communicate with the PLC 1514 so the PLC 1514 can perform the desired inspection sequence through the I/O signals. For example, the PLC 1514 may initiate an output signal to advance a cylinder (e.g. first actuator as described above). When the cylinder is advanced, an input is provided back to the PLC 1514 to confirm the cylinder "Advanced" status, and so on.

The AI visual inspection machine 1502 includes an optics component 1522 and a lighting component 1524. The optics component 1522 may be the camera 128 of FIG. 1. The lighting component 1524 may be the lighting mechanism 126 of FIG. 1. The optics component 1522 and the lighting component 1524 compose an imaging unit of the AI visual inspection machine 1502.

The lighting component 1524 communicates directly with the PLC 1514.

The AI visual inspection machine 1502 includes an AI device 1526. The AI device 1526 may be the node device 148 of FIG. 1. The AI device 1526 communicates directly with the optics component 1522.

The AI device 1526 communicates with the PLC 1514 via the Ethernet module 1518.

The AI visual inspection machine 1502 also includes a display/human-machine interface (HMI) 1528 and a human interface 1530. The display/HMI 1528 may be the display 158 or user control device 150 of FIG. 1. The human interface 1530 may be the user interface 160 of FIG. 1. The display/HMI 1528 communicates directly with the human interface 1530.

The display/HMI 1528 communicates with the PLC 1514 via the Ethernet module 1518.

The human interface 1530 communicates directly with the AI device 1526.

While the above description provides examples of one or more apparatus, methods, or systems, it will be appreciated that other apparatus, methods, or systems may be within the scope of the claims as interpreted by one of skill in the art.

The invention claimed is:

1. A system for visual inspection of an article, the system comprising:
   a camera for acquiring image data of an article under inspection;
   a node computing device for receiving the image data from the camera and analyzing the image data using a defect detection model trained to detect at least one defect type, the defect detection model comprising a machine-learning based object detection model configured to receive the image data as an input and generate defect data describing a detected defect as an output; and
   a programmable logic controller ("PLC") device for receiving the defect data from the node computing device;
   wherein the defect data includes a defect class corresponding to a defect type, a defect location, and a confidence level, and wherein the defect detection model is configured to perform multiclass classification for classifying instances into one of three or more classes, wherein the classes include at least two defect types.

2. The system of claim 1, wherein upon determining the defect data is unacceptable, a robotic arm is configured to autonomously move the camera to an article identifier position at which an article identifier on the article under inspection is within the imaging zone of the camera and the camera is configured to acquire an image of the article identifier.

3. The system of claim 1, further comprising a robotic arm for autonomously moving the camera through a predetermined sequence of imaging positions during inspection of the article.

4. The system of claim 1, further comprising an article manipulator configured to engage and rotate the article during inspection.

5. The system of claim 1, wherein the image data comprises a plurality of images acquired during rotation of the article, wherein the node computing device is configured to construct a stitched image from the plurality of images using an image stitching technique, and wherein the image data is provided to the defect detection model as the stitched image.

6. The system of claim 1, further comprising a user control device for receiving data from at least one of the PLC device and the node device, generating a visualization using the received data, and displaying the visualization in a user interface, wherein the user interface includes a PLC mode and a node device mode, wherein the PLC mode displays a visualization of PLC device operations and the node device mode displays a visualization of node device operation, and wherein the user control device is configured to switch between the PLC mode and the node device mode automatically.

7. The system of claim 1, wherein the node computing device is configured to send the defect data to the PLC device upon confirming the detected defect has appeared in a requisite number of consecutive image frames.

8. An artificial intelligence ("AI") visual inspection system comprising:
   a node computing device configured to:
      receive image data of an article under inspection; and
      analyze the image data using a defect detection model trained to detect at least one defect type, the defect detection model comprising a machine-learning based object detection model configured to receive the image data as an input and generate defect data describing a detected defect as an output; and
   a programmable logic controller ("PLC") device communicatively connected to the node computing device and configured to:
      receive the defect data from the node computing device;
   wherein the defect data includes a defect class corresponding to a defect type, a defect location, and a confidence level, and wherein the defect detection model is configured to perform multiclass classification for classifying instances into one of three or more classes, wherein the classes include at least two defect types.

9. The system of claim 8, wherein the defect detection model comprises a neural network, and wherein the neural network has been optimized by fusing layers of the neural network to compress the size of the neural network to run on the node computing device.

10. The system of claim 8, wherein the node computing device is further configured to determine whether the detected defect is a true detection by tracking the defect across consecutive image frames.

11. The system of claim 8, wherein the image data comprises a plurality of images acquired during rotation of the article, wherein the node computing device is configured to construct a stitched image from the plurality of images using an image stitching technique, and wherein the image data is provided to the defect detection model as the stitched image.

12. A method of automated visual inspection of an article using artificial intelligence ("AI"), the method comprising:
- acquiring image data of an article under inspection using a camera;
- providing the image data to a node computing device;
- analyzing the image data at the node computing device using a defect detection model trained to detect at least one defect type, the defect detection model comprising a machine-learning based object detection model configured to receive the image data as an input and generate defect data describing a detected defect as an output;
- sending the defect data from the node computing device to a programmable logic controller ("PLC") device;
- wherein the defect data includes a defect class corresponding to a defect type, a defect location, and a confidence level, and wherein the defect detection model is configured to perform multiclass classification for classifying instances into one of three or more classes, wherein the classes include at least two defect types.

13. The method of claim 12, further comprising tracking the detected defect across consecutive image frames using the node computing device.

14. The method of claim 12, wherein sending the defect data from the node computing device to the PLC device is performed in response to the detected defect being tracked across a requisite number of consecutive image frames.

15. The method of claim 12, wherein the image data comprises a plurality of images acquired during rotation of the article, wherein the method further comprises:
- constructing a stitched image from the plurality of images using an image stitching technique; and
- providing the image data to the defect detection model as the stitched image.

16. The method of claim 12, further comprising generating a stop inspection command at the PLC device upon determining the defect data is unacceptable.

17. The method of claim 12, further comprising:
- generating an alarm command at the PLC device upon determining the defect data is unacceptable;
- sending the alarm command to an alarm system configured to generate and output an alarm.

18. The method of claim 12, further comprising continuing inspection of the article upon determining the defect data is unacceptable and updating a defect counter for the article to include the detected defect.

19. The method of claim 12, further comprising:
- upon determining the defect data is unacceptable, autonomously moving the camera to an article identifier position at which an article identifier on the article under inspection is within the imaging zone of the camera;
- acquiring an image of the article identifier; and
- storing the article identifier and the defect data in a database, wherein the article identifier is associated with the defect data.

* * * * *